(12) United States Patent
Kincaid et al.

(10) Patent No.: US 10,196,254 B2
(45) Date of Patent: Feb. 5, 2019

(54) COMPACT PORTABLE COOLING CONTAINER AND KEG DISPENSER

(71) Applicants: David A. Kincaid, Atlanta, GA (US); Tim Kalbas, Atlanta, GA (US); Dan Wirtz, Atlanta, GA (US); Allen Broughton, Atlanta, GA (US); Sean McLaren, Atlanta, GA (US); Ian Mackay, Atlanta, GA (US)

(72) Inventors: David A. Kincaid, Atlanta, GA (US); Tim Kalbas, Atlanta, GA (US); Dan Wirtz, Atlanta, GA (US); Allen Broughton, Atlanta, GA (US); Sean McLaren, Atlanta, GA (US); Ian Mackay, Atlanta, GA (US)

(73) Assignee: Pik Six LLC, Atlanta, GA (US)

( * ) Notice: Subject to any disclaimer, the term of this patent is extended or adjusted under 35 U.S.C. 154(b) by 0 days.

(21) Appl. No.: 15/804,602

(22) Filed: Nov. 6, 2017

(65) Prior Publication Data

US 2018/0057341 A1 Mar. 1, 2018

Related U.S. Application Data

(63) Continuation-in-part of application No. 15/007,269, filed on Jan. 27, 2016, now Pat. No. 9,809,238.

(Continued)

(51) Int. Cl.
| | |
|---|---|
| *B67D 1/00* | (2006.01) |
| *B67D 1/08* | (2006.01) |
| *B62B 5/06* | (2006.01) |
| *B62B 1/26* | (2006.01) |
| *B65D 25/28* | (2006.01) |
| *B65D 77/04* | (2006.01) |

(Continued)

(52) U.S. Cl.
CPC ............ *B67D 1/0081* (2013.01); *B62B 1/264* (2013.01); *B62B 5/06* (2013.01); *B65D 25/2852* (2013.01); *B65D 45/02* (2013.01); *B65D 77/0493* (2013.01); *B65D 81/3886* (2013.01); *B67D 1/0071* (2013.01); *B67D 1/0831* (2013.01); *B67D 1/0857* (2013.01); *B62B 2204/06* (2013.01); *B65D 25/205* (2013.01); *B65D 25/2897* (2013.01); *B67D 1/0804* (2013.01); *B67D 2001/0087* (2013.01); *B67D 2001/0822* (2013.01); *B67D 2210/00133* (2013.01)

(58) Field of Classification Search
CPC ....... B62B 1/264; B62B 5/06; B65D 25/2852; B65D 45/02; B65D 77/0493; B65D 81/3886; B65D 25/205
USPC .......................................... 222/608
See application file for complete search history.

(56) References Cited

U.S. PATENT DOCUMENTS

| | | | | |
|---|---|---|---|---|
| 519,534 | A * | 5/1894 | James ................. | B65D 47/305 |
| | | | | 222/534 |
| 1,477,742 | A * | 12/1923 | Wright ................ | B25G 3/02 |
| | | | | 16/110.1 |

(Continued)

*Primary Examiner* — Patrick M Buechner
*Assistant Examiner* — Michael J Melaragno
(74) *Attorney, Agent, or Firm* — Atlanta Technology Law

(57) ABSTRACT

The present invention is directed to a portable container for a beverage, such as beer, from a Sixth barrel or Cornelius keg. The portable container is specifically designed for storing, cooling, transporting and dispensing a beverage, such as beer. The portable container has a self-contained container of $CO_2$, a regulator, and a tap for the keg.

18 Claims, 24 Drawing Sheets

Related U.S. Application Data

(60) Provisional application No. 62/108,613, filed on Jan. 28, 2015.

(51) Int. Cl.
 B65D 81/38 (2006.01)
 B65D 45/02 (2006.01)
 B65D 25/20 (2006.01)

(56) References Cited

U.S. PATENT DOCUMENTS

| | | | | |
|---|---|---|---|---|
| 1,532,016 | A * | 3/1925 | Wright | A47J 41/022 217/125 |
| 2,003,050 | A * | 5/1935 | Iselin | F25D 3/02 222/131 |
| 2,060,941 | A * | 11/1936 | Kline | B65D 7/045 220/592.2 |
| 2,060,942 | A * | 11/1936 | Kline | B65D 15/02 220/592.19 |
| 2,104,467 | A * | 1/1938 | Marzolf | B67D 1/04 220/314 |
| 2,182,116 | A * | 12/1939 | Copeman | B67D 1/06 220/592.19 |
| 2,259,852 | A * | 10/1941 | Hall | B67D 1/06 62/376 |
| 2,516,728 | A * | 7/1950 | Smith | B65D 25/42 220/768 |
| 2,626,200 | A * | 1/1953 | Patch | B67D 1/0861 220/592.19 |
| 2,722,137 | A * | 11/1955 | Russell | G05G 1/06 16/430 |
| 2,786,606 | A * | 3/1957 | Dushek | B67D 3/00 137/616 |
| 2,792,692 | A * | 5/1957 | Bryan | B67D 1/04 222/146.6 |
| 2,828,055 | A * | 3/1958 | Pearson | B65D 47/068 222/513 |
| 2,917,906 | A * | 12/1959 | Woolley | F25D 3/06 222/146.6 |
| 2,961,283 | A * | 11/1960 | Hennion | A47B 69/00 312/311 |
| 3,130,443 | A * | 4/1964 | Tonelli | B62B 5/06 16/110.1 |
| 3,178,896 | A * | 4/1965 | Sandsto | F25B 21/02 62/3.64 |
| 3,180,529 | A * | 4/1965 | Buffington | F25D 11/00 222/131 |
| 3,232,489 | A * | 2/1966 | Buffington | B67D 1/06 211/150 |
| 3,232,491 | A * | 2/1966 | Hunt | B65D 81/3827 217/52 |
| 4,042,142 | A * | 8/1977 | Ruano | A47G 23/04 220/4.21 |
| 4,071,160 | A * | 1/1978 | Vick | B65D 81/3886 206/514 |
| 4,164,853 | A * | 8/1979 | McDonough | F25D 3/06 222/108 |
| 4,220,048 | A * | 9/1980 | Grepiotis | B67D 1/02 62/125 |
| 4,242,884 | A * | 1/1981 | Kotschwar | F25D 3/08 220/592.19 |
| 4,291,814 | A * | 9/1981 | Conn | B65D 77/28 215/229 |
| 4,350,267 | A * | 9/1982 | Nelson | B67D 1/04 222/131 |
| 4,431,326 | A * | 2/1984 | Braithwaite | B05C 17/002 220/254.7 |
| 4,481,791 | A * | 11/1984 | German | B67D 1/0857 62/400 |
| 4,483,157 | A * | 11/1984 | Human | B67D 1/0857 62/400 |
| 4,519,219 | A * | 5/1985 | Prepodnik | F25D 3/06 206/519 |
| 4,633,678 | A * | 1/1987 | Lea | B67D 1/0857 220/592.19 |
| 4,642,999 | A * | 2/1987 | Justice | B65D 81/3879 220/4.26 |
| 4,655,365 | A * | 4/1987 | Miller | F16J 13/18 105/377.07 |
| 4,699,282 | A * | 10/1987 | Farrar | B65D 81/38 206/459.5 |
| 4,724,681 | A * | 2/1988 | Bartholomew | F25D 3/06 190/18 A |
| 4,802,344 | A * | 2/1989 | Livingston | A45F 3/16 62/372 |
| 4,844,300 | A * | 7/1989 | Simons | B67D 1/06 222/108 |
| 4,873,841 | A * | 10/1989 | Bradshaw | A45C 5/14 280/47.17 |
| 5,012,553 | A * | 5/1991 | Hardigg | B65D 25/2841 16/445 |
| 5,044,514 | A * | 9/1991 | Portat | B65D 11/06 220/23.87 |
| 5,129,552 | A * | 7/1992 | Painchaud | B67D 1/06 222/146.6 |
| 5,203,468 | A * | 4/1993 | Hsu | A47G 19/2272 220/254.3 |
| 5,282,561 | A * | 2/1994 | Mihalich | B67D 1/0857 222/146.6 |
| D366,599 | S * | 1/1996 | Brown | D7/605 |
| 5,683,097 | A * | 11/1997 | Fenton | A45C 5/14 280/47.26 |
| 5,803,472 | A * | 9/1998 | Lien | A45C 5/14 108/129 |
| 5,860,527 | A * | 1/1999 | Frankenberg | B65D 1/22 206/509 |
| 5,904,269 | A * | 5/1999 | Wolff | B65D 25/2852 220/756 |
| 5,956,966 | A * | 9/1999 | Wendell | B67D 1/0857 62/389 |
| 6,010,043 | A * | 1/2000 | Williamson | B67D 1/06 222/129.1 |
| 6,131,972 | A * | 10/2000 | Whitehead | B25G 1/102 16/430 |
| 6,311,991 | B1 * | 11/2001 | Conrado | A45C 5/14 280/47.26 |
| 6,328,320 | B1 * | 12/2001 | Walski | B65F 1/1468 220/908 |
| 6,364,329 | B1 * | 4/2002 | Holub | A45C 5/14 280/47.26 |
| 6,446,988 | B1 * | 9/2002 | Kho | A45C 5/14 16/405 |
| 6,454,131 | B1 * | 9/2002 | Van Der Meer | B01D 3/20 222/105 |
| 6,467,779 | B1 * | 10/2002 | Mills | A01K 97/06 224/922 |
| 6,481,238 | B1 * | 11/2002 | Jennings | B67D 1/06 62/371 |
| 6,695,177 | B2 * | 2/2004 | Blicher | B67D 1/0406 222/396 |
| 6,783,034 | B1 * | 8/2004 | Brent | B67D 1/0418 222/183 |
| 7,246,727 | B2 * | 7/2007 | Magermans | B67D 1/0412 222/529 |
| 7,500,622 | B2 * | 3/2009 | Golding | B65D 25/30 220/711 |
| 7,584,873 | B2 * | 9/2009 | Grittmann | B67D 1/0418 222/394 |
| 7,757,908 | B1 * | 7/2010 | Buhl, Jr. | B67D 1/0406 141/231 |
| 7,861,892 | B1 * | 1/2011 | White | B67D 1/06 222/108 |
| 8,087,526 | B2 * | 1/2012 | Dovey | B65D 11/06 220/4.08 |
| 8,091,378 | B1 * | 1/2012 | Farias, III | B60R 9/065 222/399 |

(56) References Cited

U.S. PATENT DOCUMENTS

| | | | | |
|---|---|---|---|---|
| 8,424,901 B2* | 4/2013 | Vanderberg | ............... | B62B 3/10 280/47.18 |
| 8,544,648 B2* | 10/2013 | Cleveland | .......... | B65D 21/0223 206/503 |
| 8,690,028 B2* | 4/2014 | Risheq | .................... | B67D 1/04 222/608 |
| 8,979,101 B2* | 3/2015 | Primiano | .................. | B62B 3/00 220/592.03 |
| D732,327 S* | 6/2015 | Ciuksza, Jr. | .................... | D7/300 |
| 9,156,671 B2* | 10/2015 | Taylor | .................. | B67D 1/0801 |
| 9,389,010 B1* | 7/2016 | Booker, Sr. | ............... | B62B 3/02 |
| 9,568,236 B1* | 2/2017 | Laskowski | ................ | F25D 3/08 |
| 9,809,238 B2* | 11/2017 | Kincaid | .................. | B62B 1/264 |
| 2004/0025531 A1* | 2/2004 | Holloman-Hughes | ..................... | A45C 11/20 62/457.7 |
| 2004/0222231 A1* | 11/2004 | Aiken | .................. | B65F 1/1468 220/759 |
| 2004/0232158 A1* | 11/2004 | Aiken | .................. | B65F 1/1468 220/759 |
| 2006/0011664 A1* | 1/2006 | Hammond | ........... | B67D 1/0406 222/399 |
| 2006/0283879 A1* | 12/2006 | Rasmussen | .......... | B67D 1/0001 222/81 |
| 2007/0084883 A1* | 4/2007 | Magermans | ......... | B67D 1/0412 222/400.7 |
| 2008/0006051 A1* | 1/2008 | Johnson | ................ | F25D 31/006 62/371 |
| 2008/0016653 A1* | 1/2008 | Baradzi | .................. | B25G 1/102 16/430 |
| 2008/0156805 A1* | 7/2008 | Perry | ................. | B65D 25/2897 220/361 |
| 2008/0156806 A1* | 7/2008 | Perry | ................. | B65D 25/2897 220/361 |
| 2008/0156808 A1* | 7/2008 | Perry | ................. | B65D 25/2897 220/560.03 |
| 2008/0156858 A1* | 7/2008 | Perry | ................. | B65D 25/2897 229/104 |
| 2008/0264953 A1* | 10/2008 | Lowman | .............. | B67D 1/0406 220/592.19 |
| 2009/0032556 A1* | 2/2009 | Zwahlen | ................ | B65D 25/46 222/534 |
| 2009/0044561 A1* | 2/2009 | Dalton | ..................... | B67D 1/06 62/398 |
| 2009/0108031 A1* | 4/2009 | Anderson | ............ | B67D 1/0839 222/394 |
| 2009/0206099 A1* | 8/2009 | Davis | .................. | A47G 23/0225 220/739 |
| 2010/0078441 A1* | 4/2010 | Barnett | ................... | A45C 13/36 220/592.2 |
| 2010/0308066 A1* | 12/2010 | Perry | .................. | B65D 25/2897 220/810 |
| 2010/0326123 A1* | 12/2010 | Johnson | ................. | F25D 31/006 62/457.9 |
| 2012/0035991 A1* | 2/2012 | Fiorito | ................... | B65D 23/14 705/14.1 |
| 2012/0132657 A1* | 5/2012 | Seiders | ............... | B65D 81/3816 220/592.2 |
| 2012/0223067 A1* | 9/2012 | Gaynor | ..................... | A47J 36/10 219/438 |
| 2012/0241345 A1* | 9/2012 | Blakeman | ................. | A45C 5/08 206/457 |
| 2012/0305571 A1* | 12/2012 | Larsen | ............... | B65D 81/3886 220/592.17 |
| 2012/0325856 A1* | 12/2012 | Ito | ......................... | B67D 1/0857 222/146.6 |
| 2013/0056484 A1* | 3/2013 | Lu | ........................... | B65D 65/40 220/739 |
| 2013/0193673 A1* | 8/2013 | Vanderberg | ................ | B62B 3/16 280/655 |
| 2013/0200581 A1* | 8/2013 | Vanderberg | ............ | B62B 5/0083 280/30 |
| 2013/0207359 A1* | 8/2013 | Vanderberg | ............. | A45C 5/146 280/30 |
| 2013/0207360 A1* | 8/2013 | Vanderberg | ............... | A45C 5/14 280/30 |
| 2013/0214501 A1* | 8/2013 | Vanderberg | ........... | B62B 5/0083 280/30 |
| 2013/0241242 A1* | 9/2013 | Carter | ..................... | B60R 3/005 296/203.01 |
| 2014/0217126 A1* | 8/2014 | Peirsman | .............. | B67D 1/0004 222/399 |
| 2014/0227401 A1* | 8/2014 | Kounlavong | ............ | A47J 27/09 426/231 |
| 2016/0214633 A1* | 7/2016 | Kincaid | ................. | B62B 1/264 |

* cited by examiner

COMPACT PORTABLE COOLING CONTAINER AND KEG DISPENSER

CROSS REFERENCE TO RELATED APPLICATION

This non-provisional application is a continuation-in-part of and claims priority to the application Ser. No. 15/007,269 filed on Jan. 27, 2016 and now U.S. Pat. No. 9,809,238, which claims priority to provisional application Ser. No. 62/108,613 filed on Jan. 28, 2015, which is fully incorporated herein by reference.

FIELD OF THE INVENTION

This invention relates to beverage dispensers, and more particularly, to a portable, cooled container and dispenser for a Sixth Barrel or Home Brew (Cornelius) keg of beer or other beverage.

BACKGROUND OF THE INVENTION

Commercial Kegs: Commercial beer kegs are available in four sizes: Half Barrel, Quarter Barrel, Slim Quarter Barrel and Sixth Barrel. These kegs are also referred to as a Full-Keg, Pony Keg (a shorter version of the full-keg, but same diameter), Slim Quarter and Torpedo Keg (43% narrower than a full-keg but the same height). The approximate full weight and number of drinks in each are as follows:
Half Barrel: 160 pounds/165.33-12 oz. drinks
Quarter Barrel/Slim Quarter: 90 pounds/82-12 oz. drinks
Sixth Barrel: 55 pounds/56-12 oz. drinks (60 cans of beer)
The majority of commercial beer kegs sold each year are half barrels. However, the sixth barrel keg is becoming the choice for many establishments, breweries and consumers that wish to use kegs smaller than a half barrel. The small footprint of a sixth barrel allows retailers to have a greater variety of beer in a small space. For the consumer, at approximately 34% the weight of a half-barrel, the sixth barrel provides a more convenient way to enjoy keg beer at home. In addition, consumers are finding more reasons to purchase sixth barrels given their smaller quantity of beer.

The Influence of Craft Beers: The popularity of the sixth barrel kegs is growing in response to the growth of craft beers. Craft beer generally refers to beer that is brewed using traditional methods, without adjuncts such as rice or corn, and focuses on flavor, creativity and originality rather than mass appeal. In the past decade, craft beers have gained in popularity in the brewing industry. According to the American Brewers Association, total beer sales dropped 1.9% in 2013. However, craft beer sales grew 17.2%. In addition, craft beer's share of the total U.S. beer market in dollars grew to more than 14% in 2013, up from 10% in 2012.

Craft beers typically cost much more then mass-produced beers. In addition, studies have shown consumers drink less beer when drinking a craft versus a mass-produced beer due to the often higher alcohol content and fuller body of the craft beer. Due to these facts and its convenient size, establishments and consumers often purchase craft beer in the sixth barrel to avoid the costly impact of the beer going bad before it is consumed.

Craft beer breweries have responded by making the majority of craft beers available for purchase in the sixth barrel size. In addition, mass produced breweries are making their more popular brands available in the sixth barrel to compete with the crafts.

The convenient size and quantity of beer in the sixth barrel coupled with the craft beer trends are driving a change in the keg marketplace. Today, sixth barrels are more abundant than ever and are generally available at your local liquor store.

Home Brewing: According to the American Homebrewers Association, there are an estimated 1.2 million homebrewers in the United States. There are two primary methods for containing home brewed beer, bottles and kegs. The Cornelius keg is designed for the home brewer and is similar in size and shape to the sixth barrel. Storing homebrew in a keg is often preferred due to the ease of kegging beer rather than bottling.

Given the popularity and portability of the sixth barrel and Cornelius keg, it stands to reason that an ideal apparatus would be a portable container for storing, cooling and dispensing these types of kegs.

SUMMARY OF THE INVENTION

In view of the foregoing background, it is therefore an object of the present invention to provide a portable container and dispenser specifically designed to hold securely in place a Sixth Barrel or Cornelius keg. These and other objects, features, and advantages of the invention are provided by an insulated container with a housing defining an interior space. The exterior and interior are made of a durable material.

The present invention includes a waterproof lid with a latch for locking the lid to the container. A hinged faucet mechanism is located on the top of the container which folds up when in use and down during transport or storage. When placed in the down position, the faucet tucks into a groove on the top of the container providing protection during transport. When the mechanism is in the upright position, the faucet extends vertically wherein the handle is pivoted forward to dispense beer, and back to the vertical position when dispensing is complete. Also on the top section is a removable drip tray located underneath the faucet for catching excess liquid during use.

The present invention includes a mechanism for holding a Sixth Barrel or Cornelius keg firmly in its center eliminating the ability for the keg to move side to side, or up and down within the container. In order to accomplish this, the inside base of the container is equipped with various molded tracks designed to correspond to the bottom of the Sixth Barrel and Cornelius kegs. As these kegs are placed into the container, the molded tracks hold the base of the keg and secure it within the center of the container. The inside top of the container has molded tracks that correspond to the top of the Sixth Barrel and Cornelius kegs. When these kegs are placed within the container and the top is closed, the keg is clamped into the center of the container, held in place by the inside bottom molded tracks and inside top molded tracks of the container. This feature also creates a consistent thickness between the keg and the inside walls of the container. This space is used for placing ice evenly around the keg within the container.

The present invention further includes a tap located inside the container for connecting to the keg. A single-gauge pressure adjusting regulator and disposable carbon dioxide cartridge are provided to control the flow of beer to the faucet. The regulator and carbon dioxide are attached on the outside of the container for easy access and are protected by a hinged door that opens and closes. Plastic tubing connects the tap, regulator, and faucet.

For moving the container, two wheels are connected to a rectilinear and elongated axle extending through the container at the bottom and outward. In addition, a pull handle is located on the same side of the container as the wheels and extends above the top. Furthermore, handles are located on the sides of the container.

A drain cock directly conjoined to the side of the container can be opened or closed to allow liquid resulting from condensation or during cleaning to be removed from the container.

DETAILED DESCRIPTION

Figure 1:
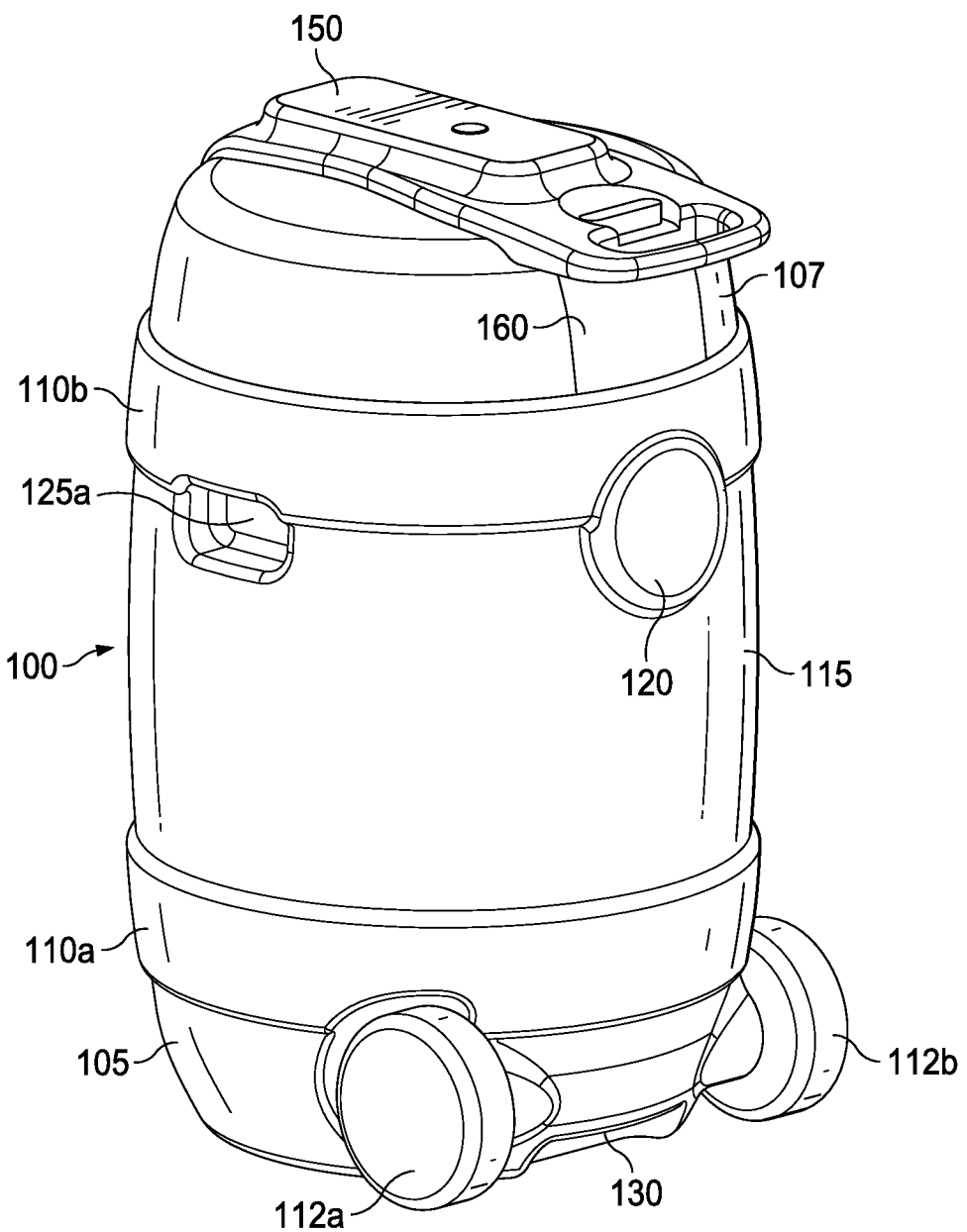
FIG. 1 is a top perspective view of the entire portable container with the handle in the down locked position.
Figure 2:
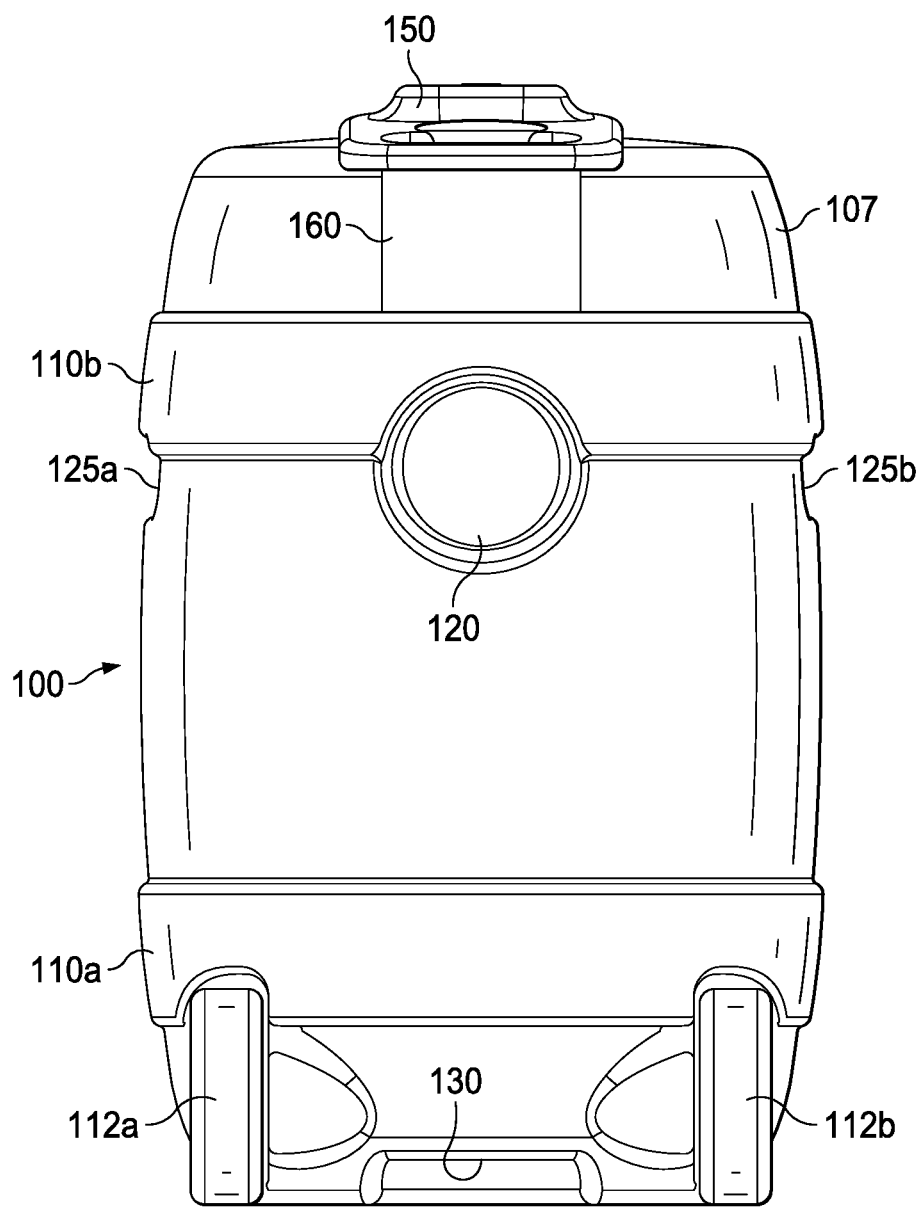
FIG. 2 is a front view of the entire portable container showing the wheels and the circular plaque mounting location on the side of the portable container.
Figure 3:
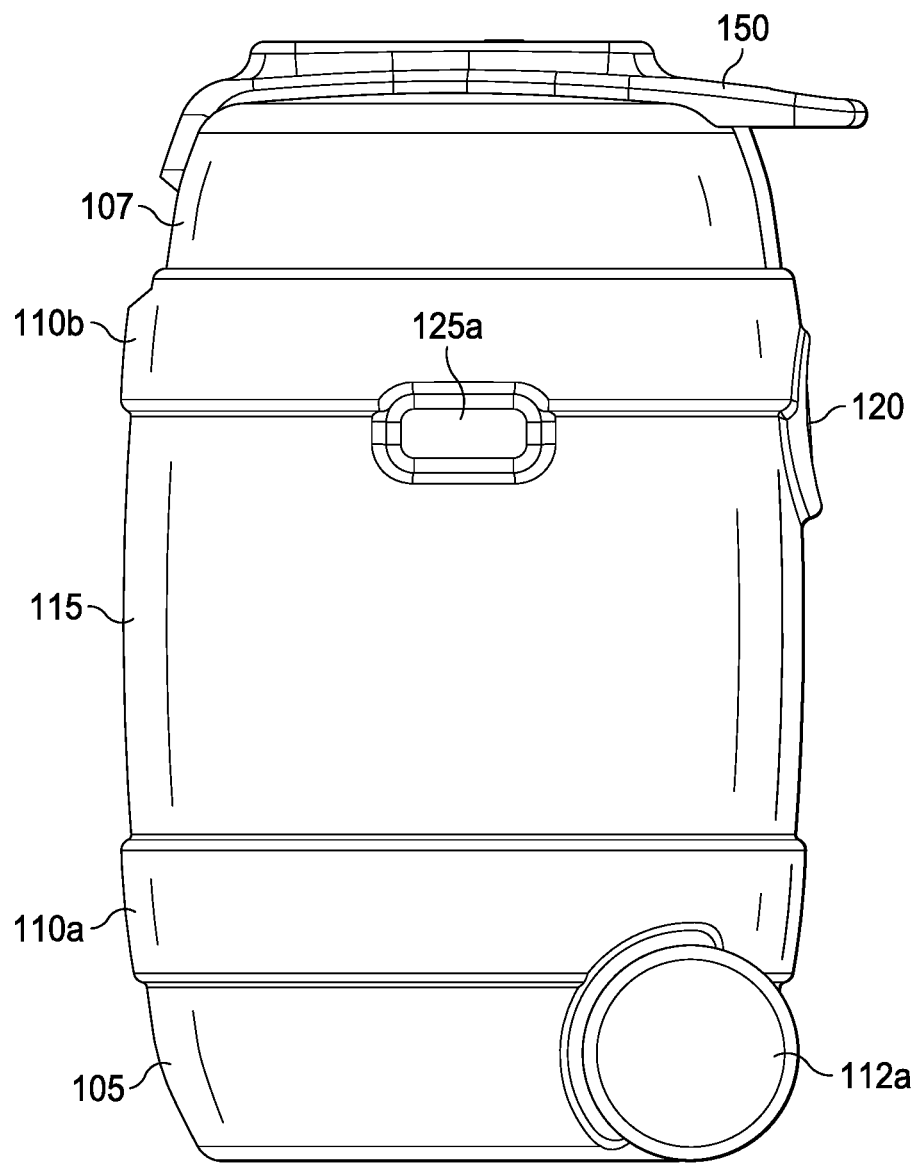
FIG. 3 is a symmetrical side view of the entire portable container with the left side view being a mirror image of the right side view.
Figure 4:
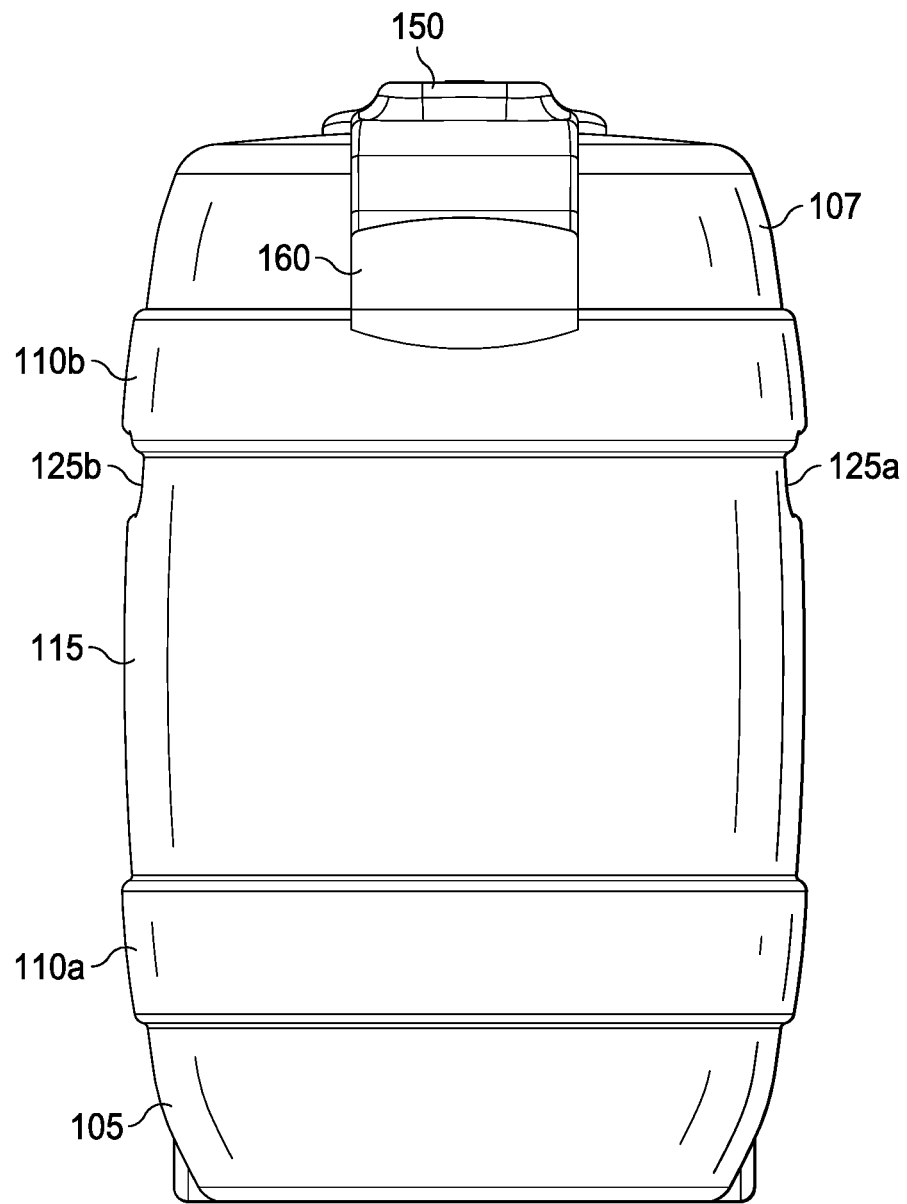
FIG. 4 is a back view of the entire portable container showing the handle in the down position.
Figure 5:
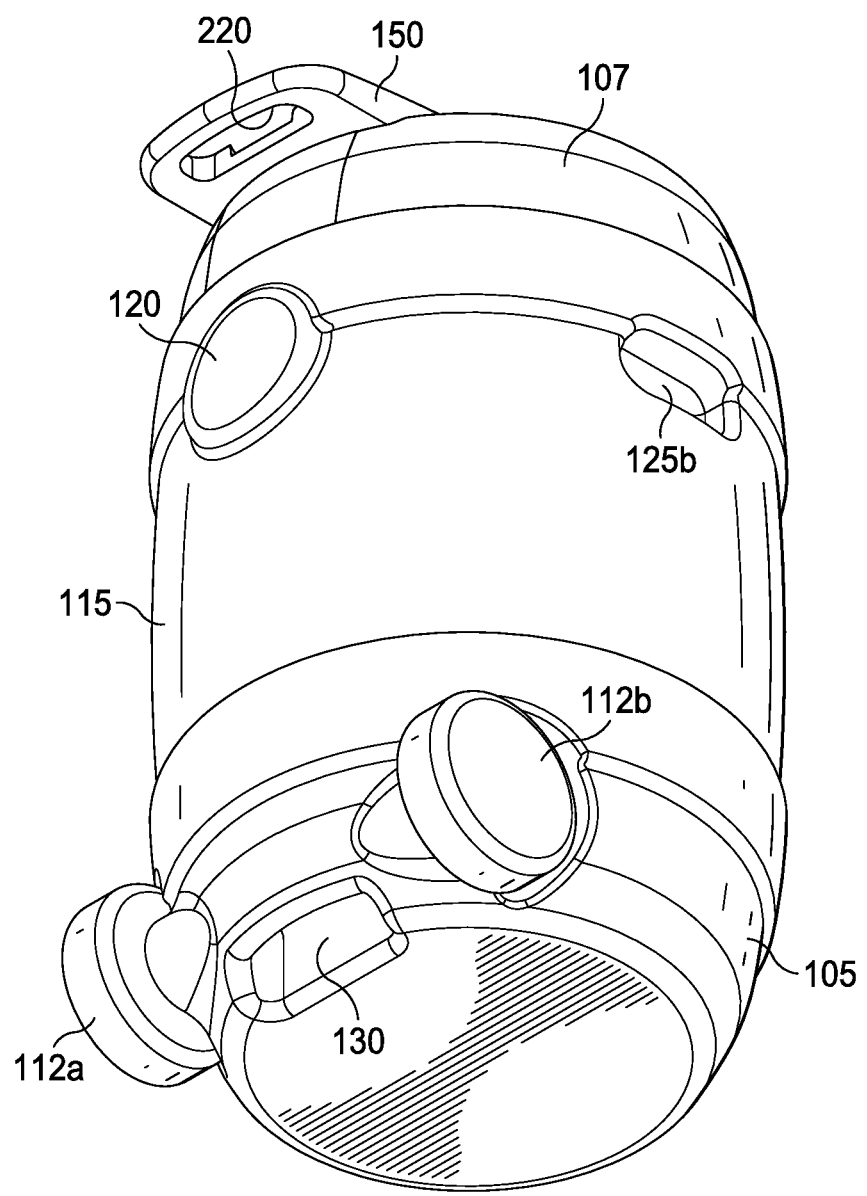
FIG. 5 is a bottom perspective view of the entire portable container with the handle in the down locked position.
Figure 6:
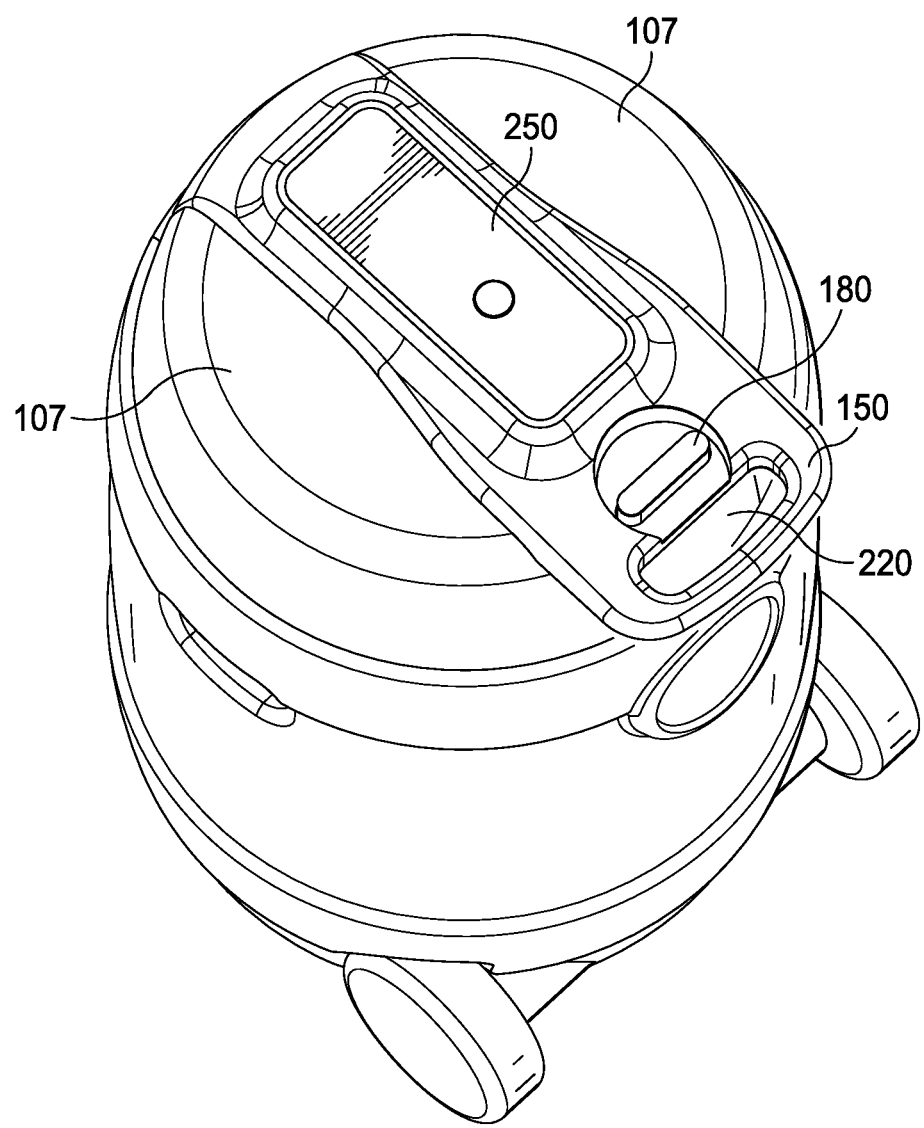
FIG. 6 is a top view of the entire portable container with the handle in the down locked position.
Figure 7:
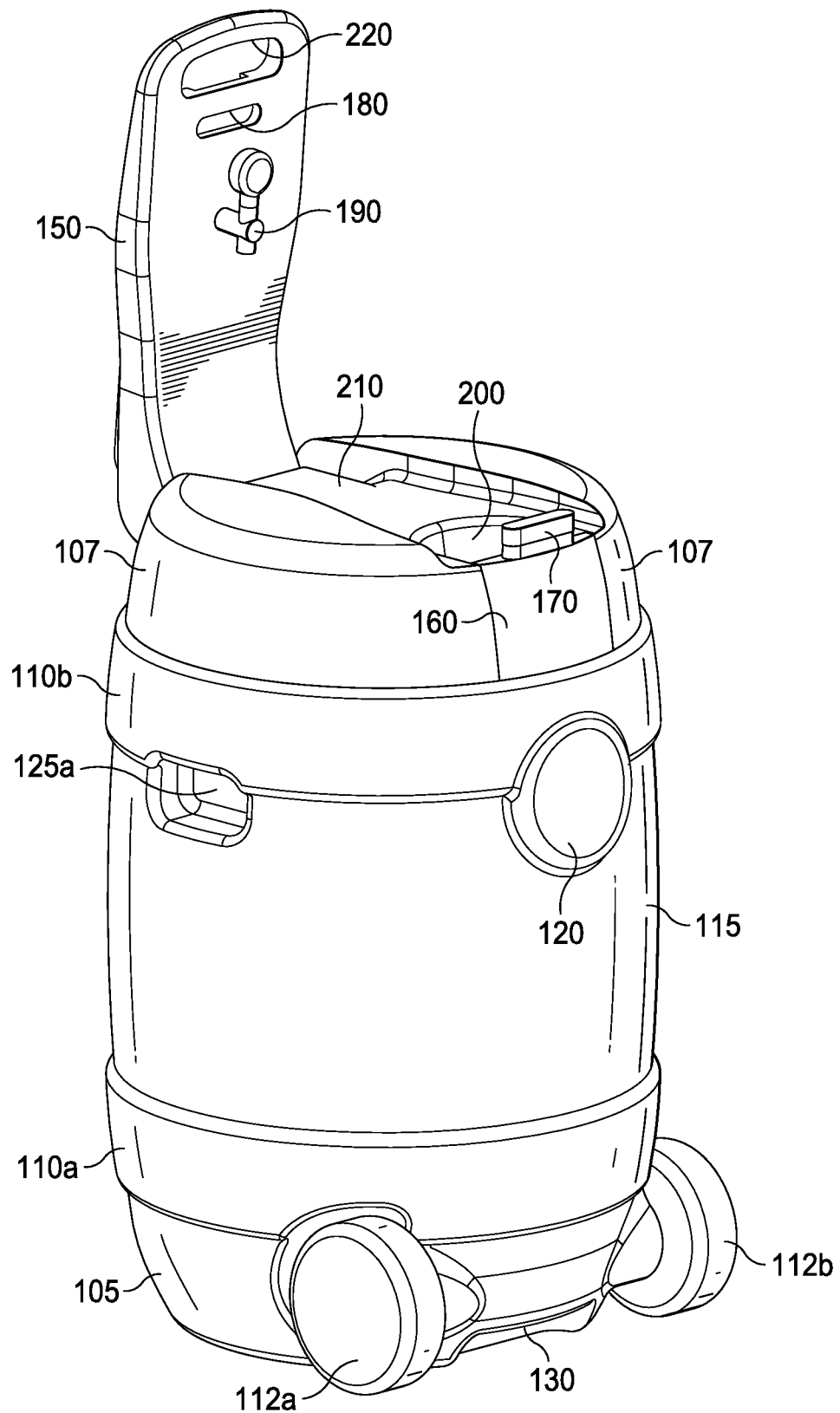
FIG. 7 is a perspective view of the entire portable container with the handle extended in the up position for dispensing beverages.
Figure 8:
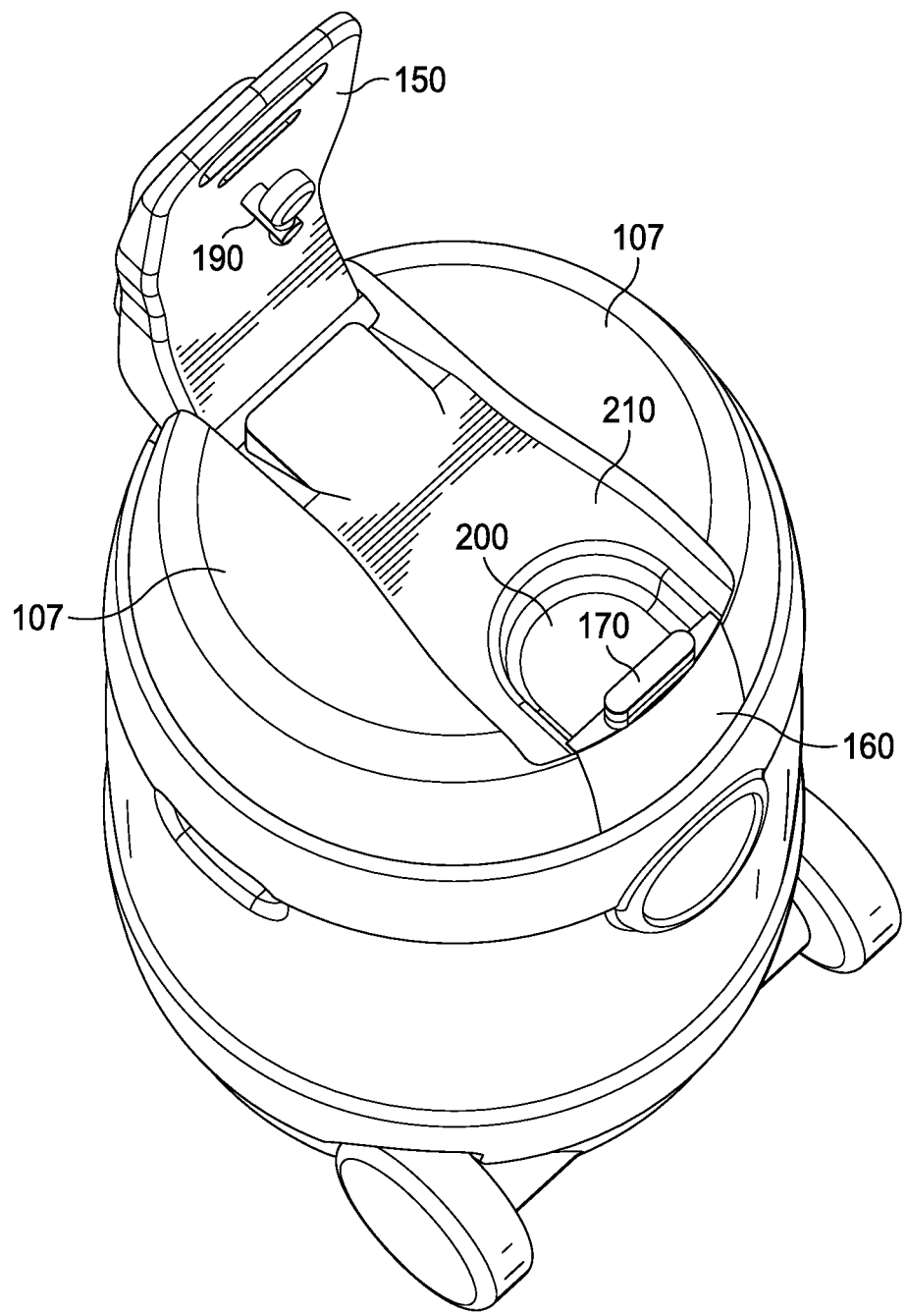
FIG. 8 is a top view of the entire portable container with the handle extended in the up position for dispensing beverages.
Figure 9:
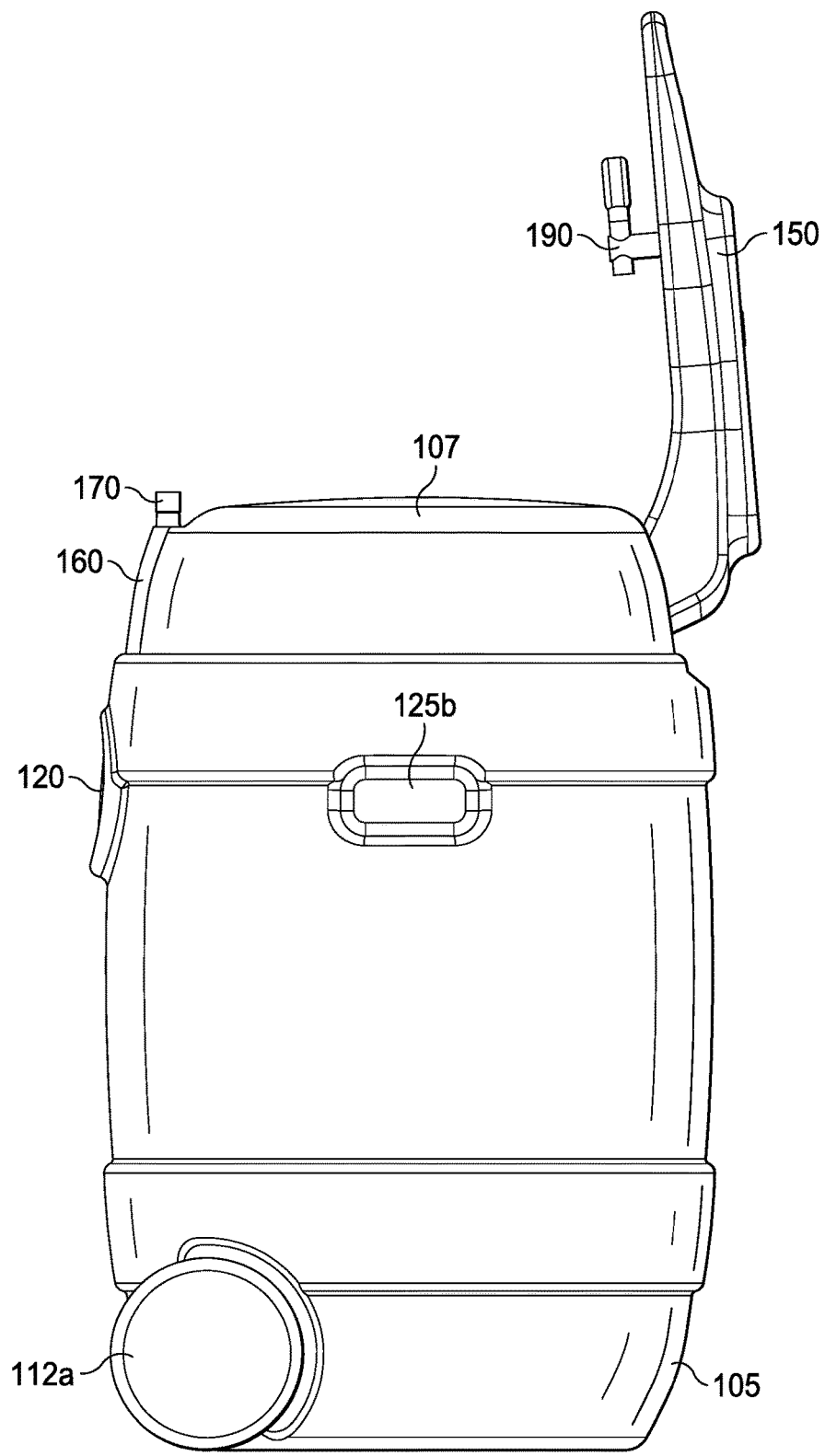
FIG. 9 a symmetrical side view of the entire portable container, with the left side view being a mirror image of the right side view, and the handle extended in the up position for dispensing beverages.
Figure 10:
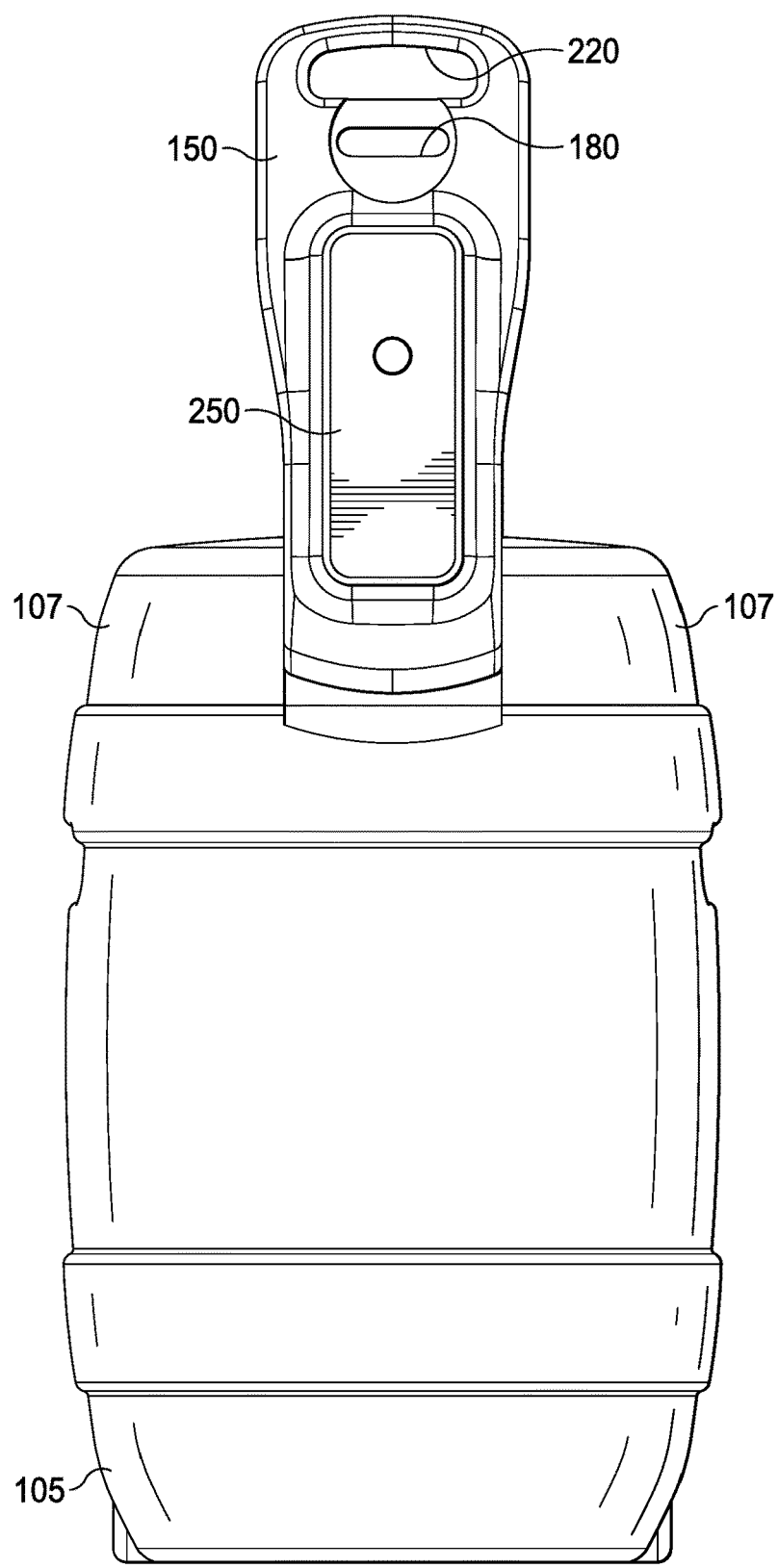
FIG. 10 is a back view of the entire portable container with the handle extended in the up position for dispensing beverages.
Figure 11:
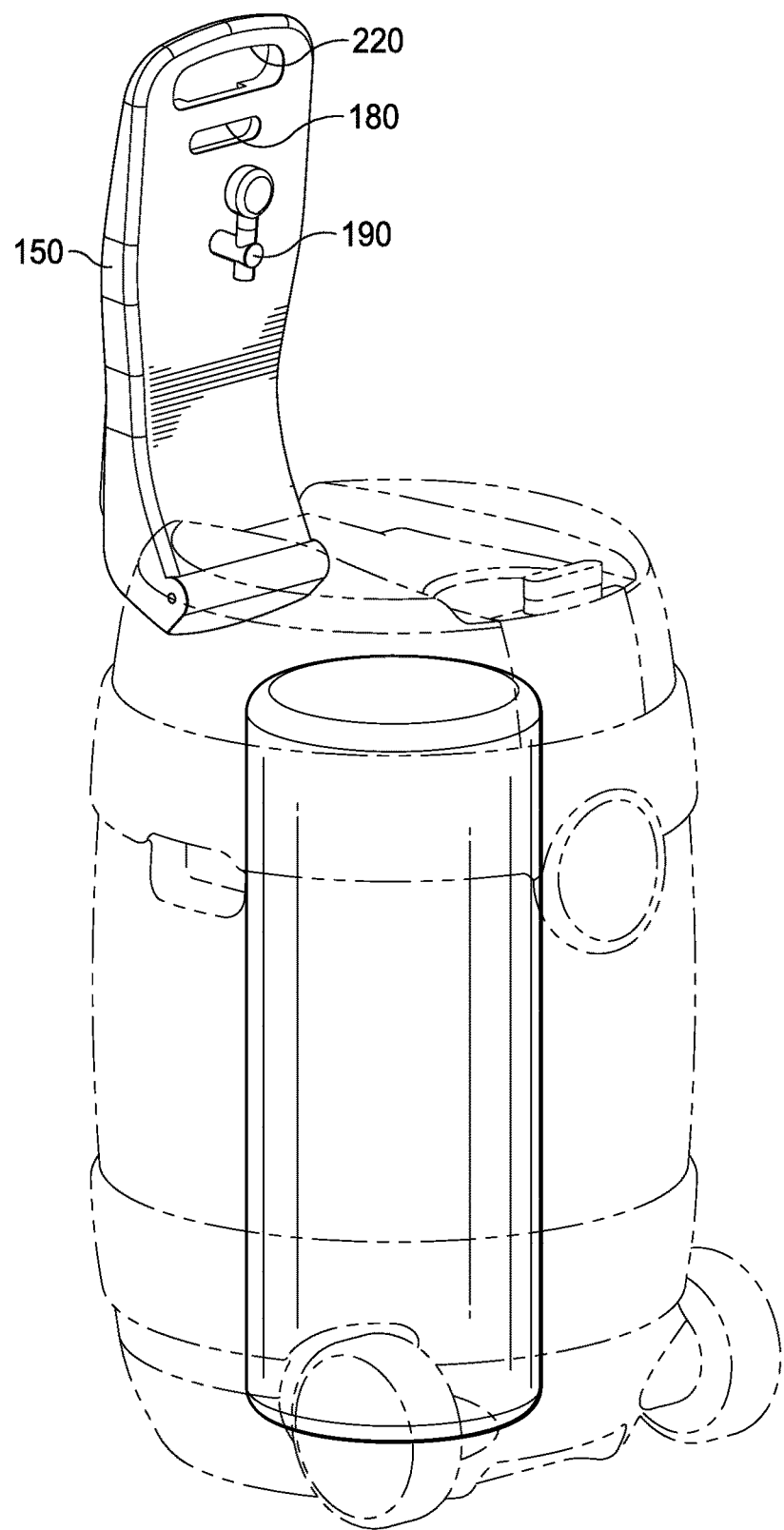
FIG. 11 is a cut away of FIG. 7 to show the placement of a Sixth Barrel or Cornelius kegs inside the portable container.
Figure 12:
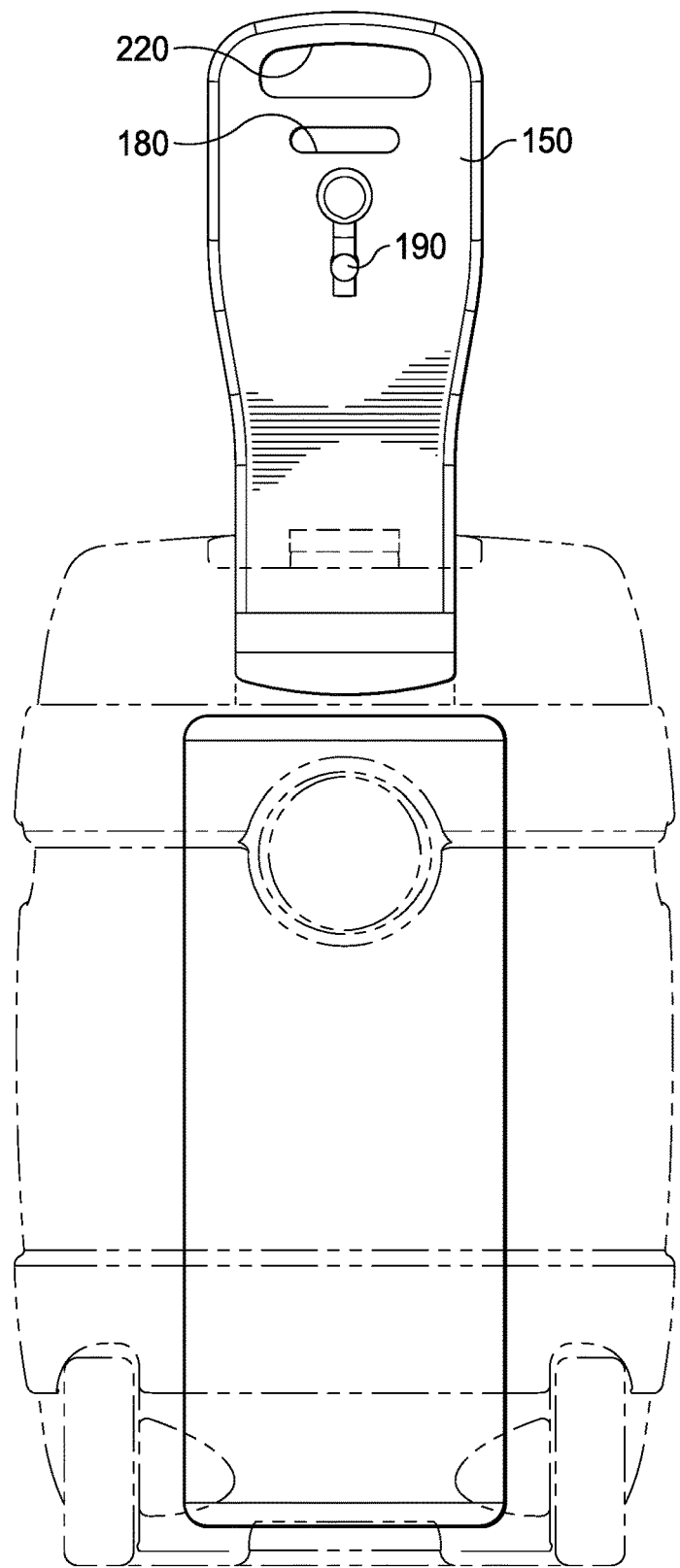
FIG. 12 is a cut away of FIG. 10 to show the placement of a Sixth Barrel or Cornelius keg inside the portable container.
Figure 13:
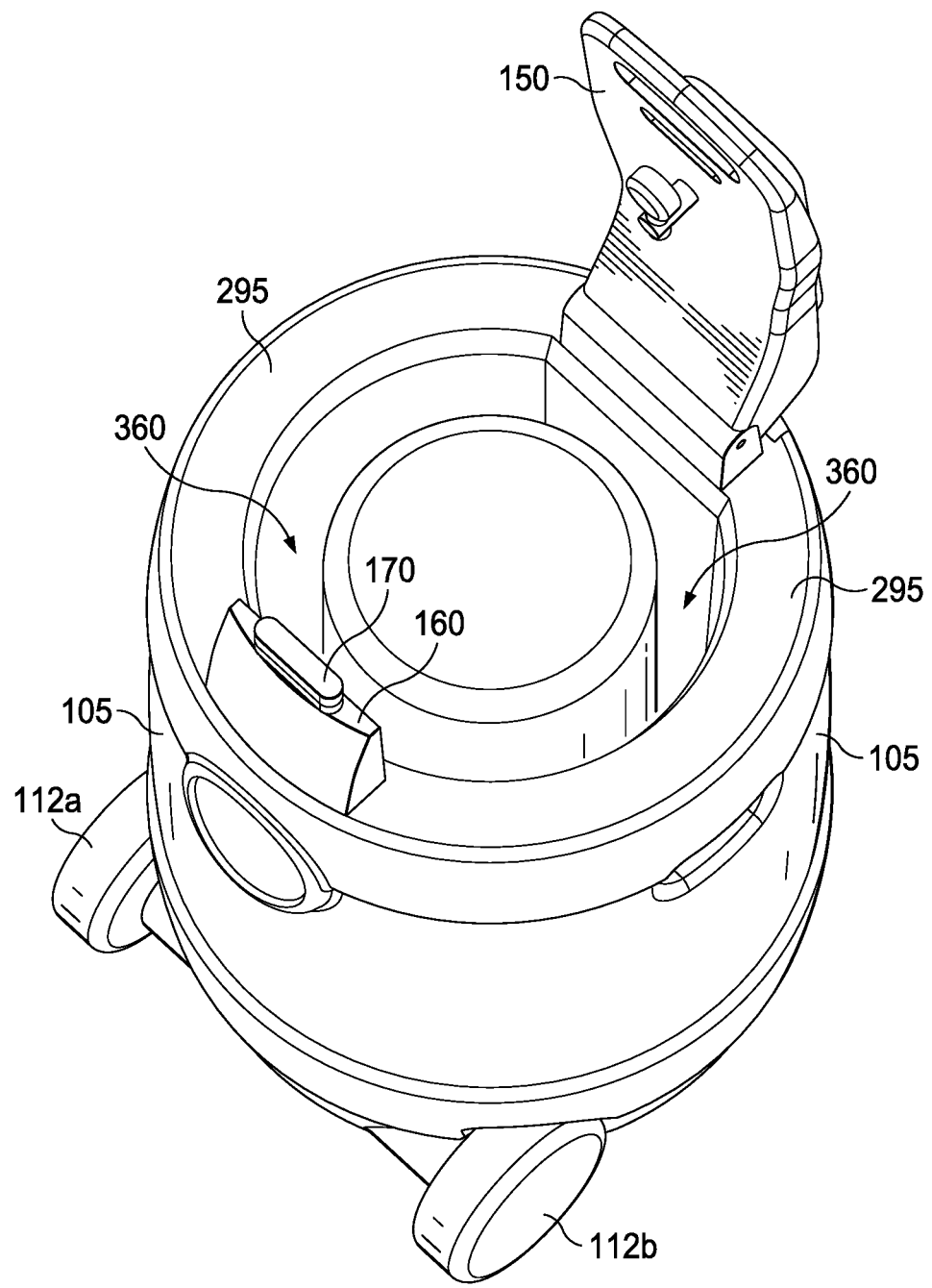
FIG. 13 is a top view of the portable container with the top of the portable container removed to show the placement of a Sixth Barrel or Cornelius keg inside the portable container.
Figure 14:
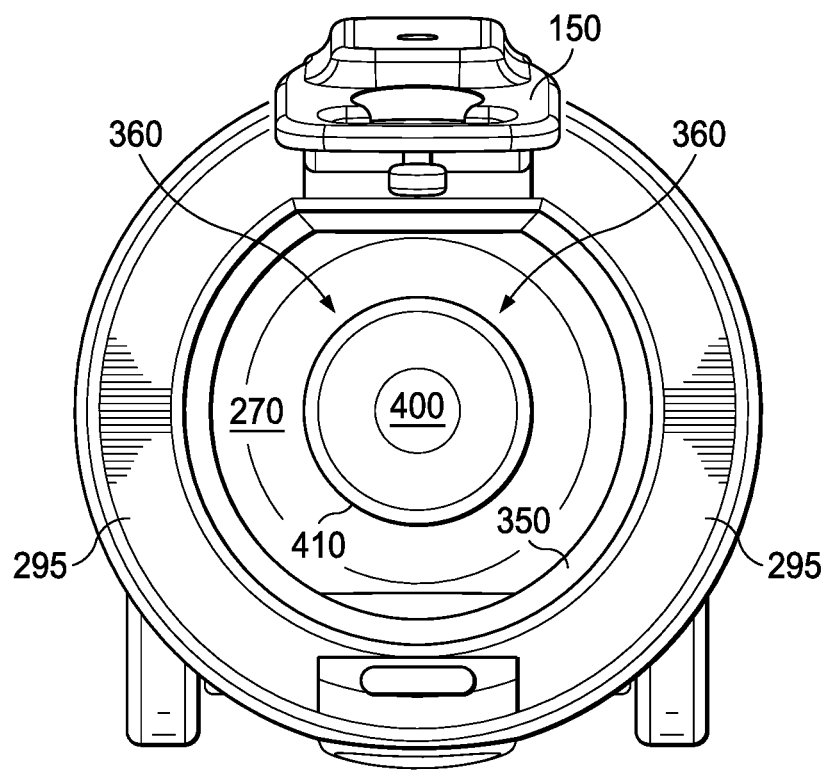
FIG. 14 is a top view of the portable container with the top of the portable container removed without a Sixth Barrel or Cornelius keg inside the portable container.
Figure 16:
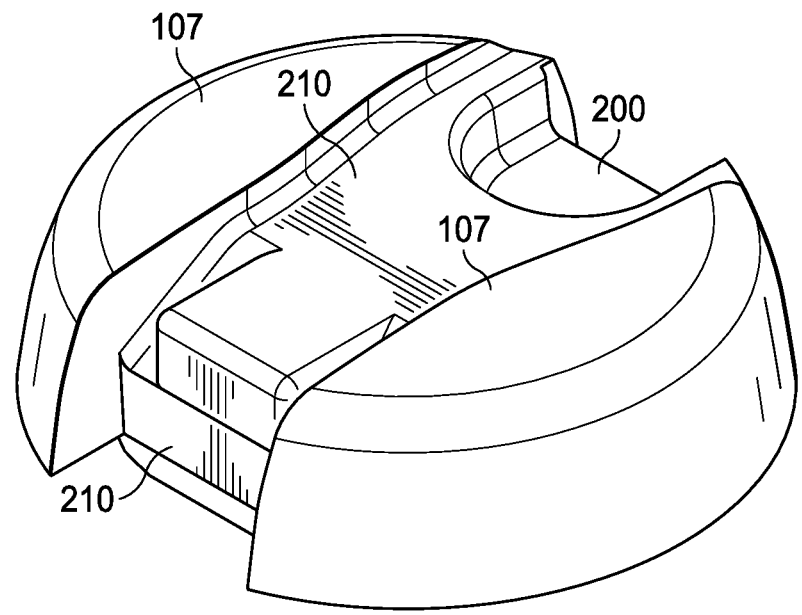
FIG. 16 is a perspective top view of the removable lid of the portable container without the handle attached.
Figure 15:
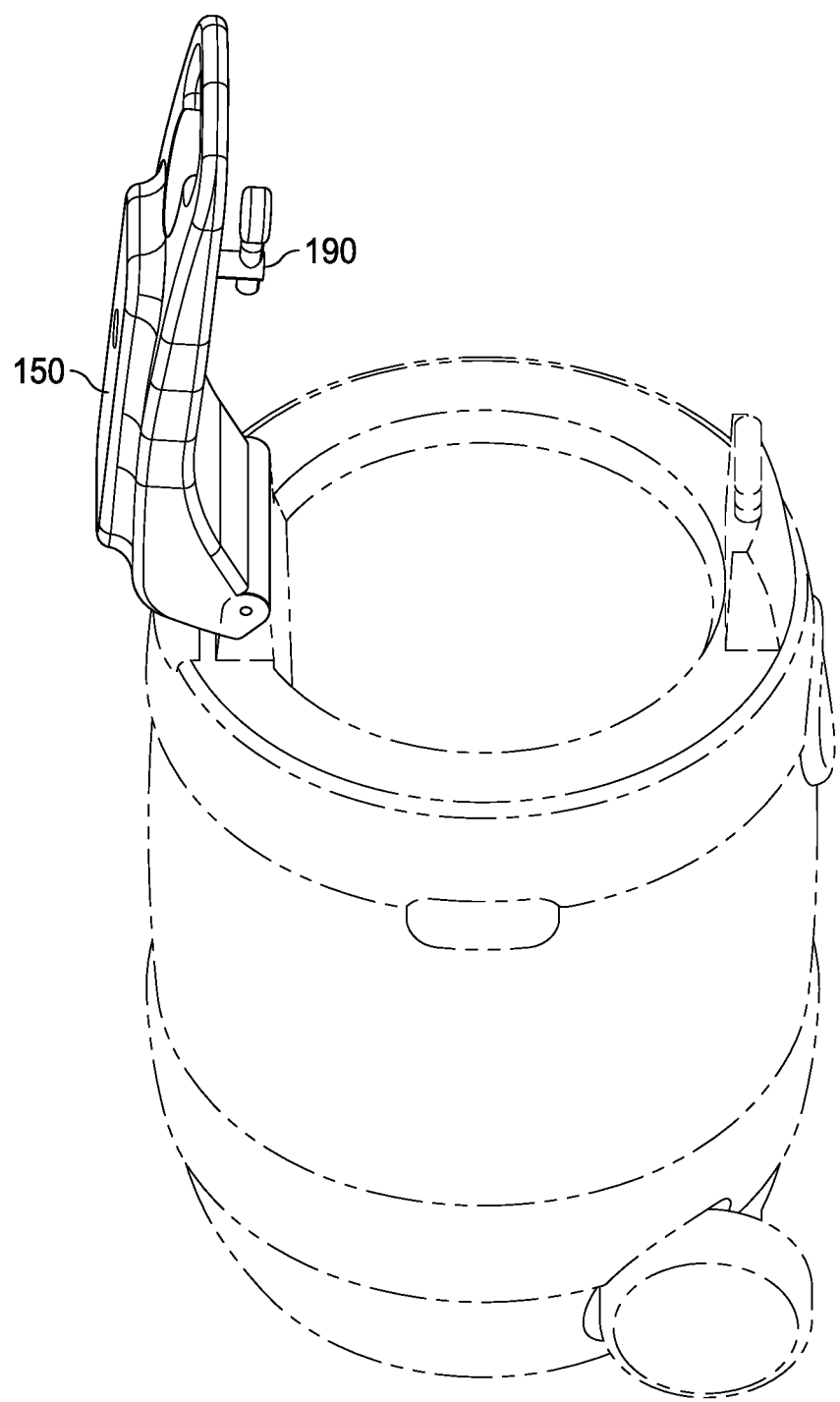
FIG. 15 is a cut away of FIG. 7 to show the inside of the portable container without a Sixth Barrel or Cornelius keg inside the portable container.
Figure 17:
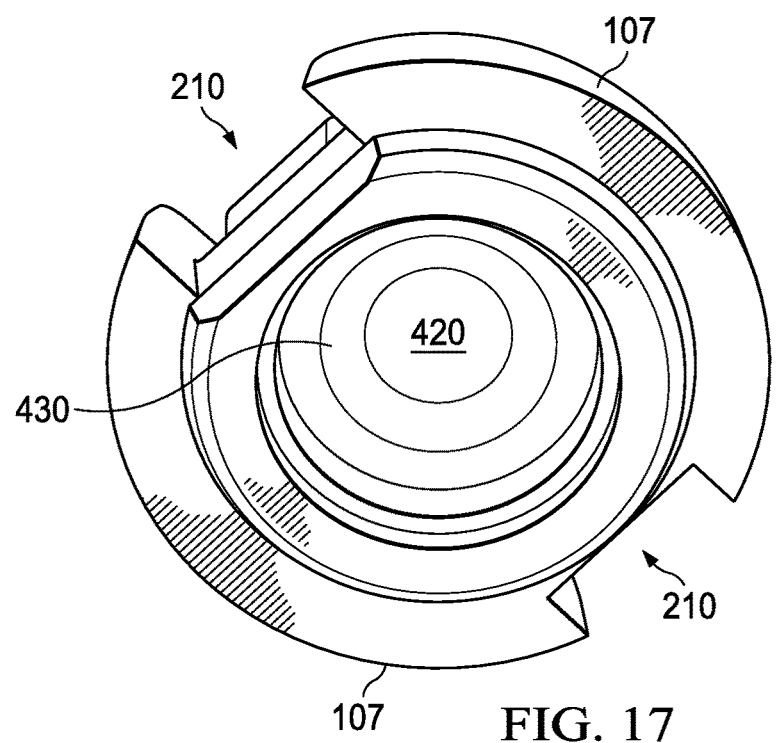
FIG. 17 is a perspective bottom view of the removable lid of the portable container.
Figure 18:
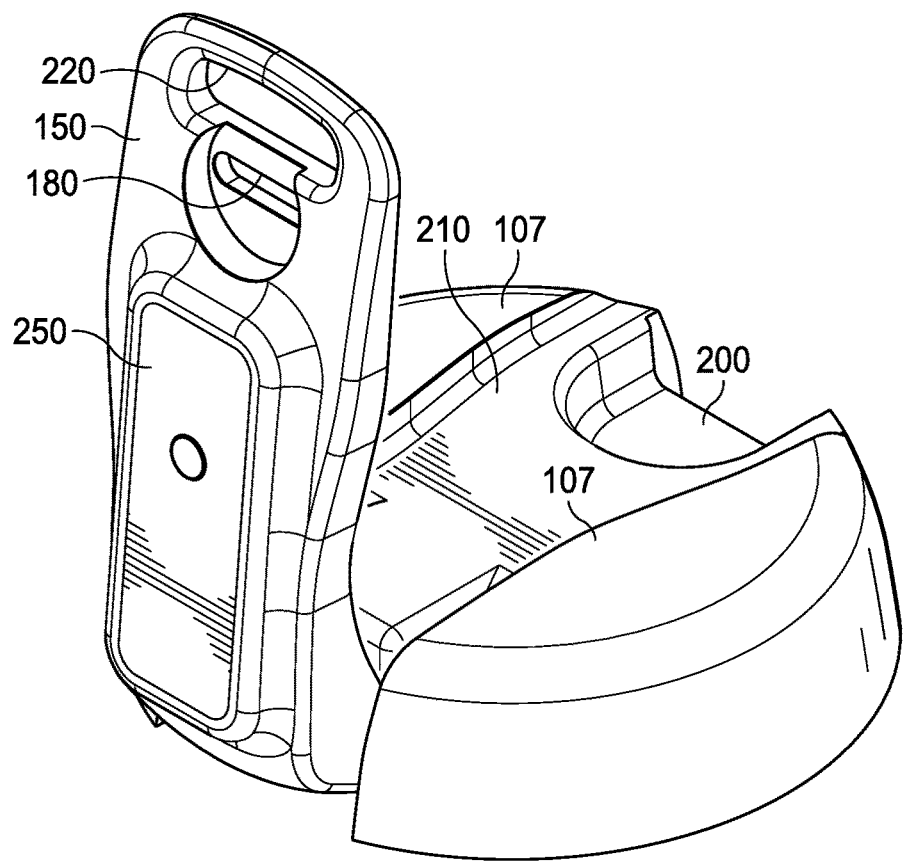
FIG. 18 is a perspective top view of the removable lid of the portable container with the handle attached and extended in the up position.
Figure 19:
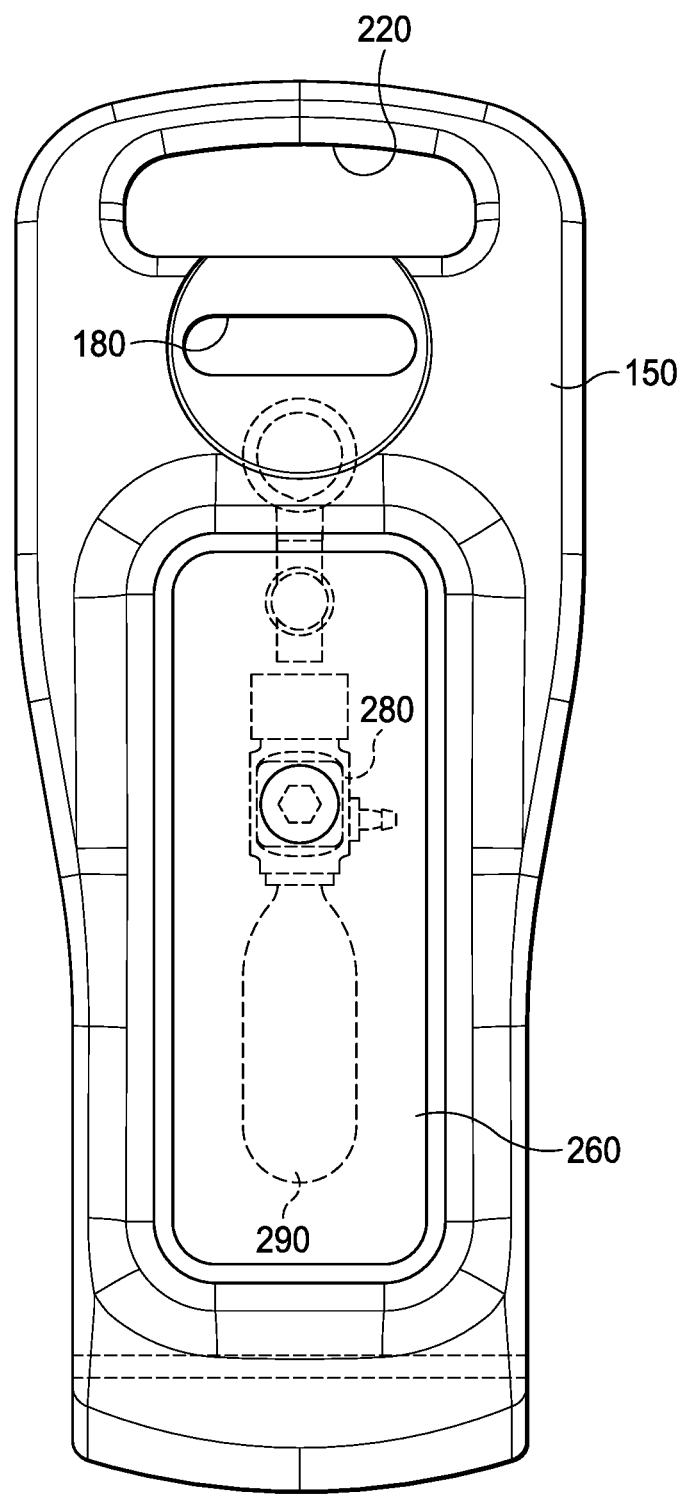
FIG. 19 is a back cut away view of the handle showing the placement of the tap and the $CO_2$ container.
Figure 20:
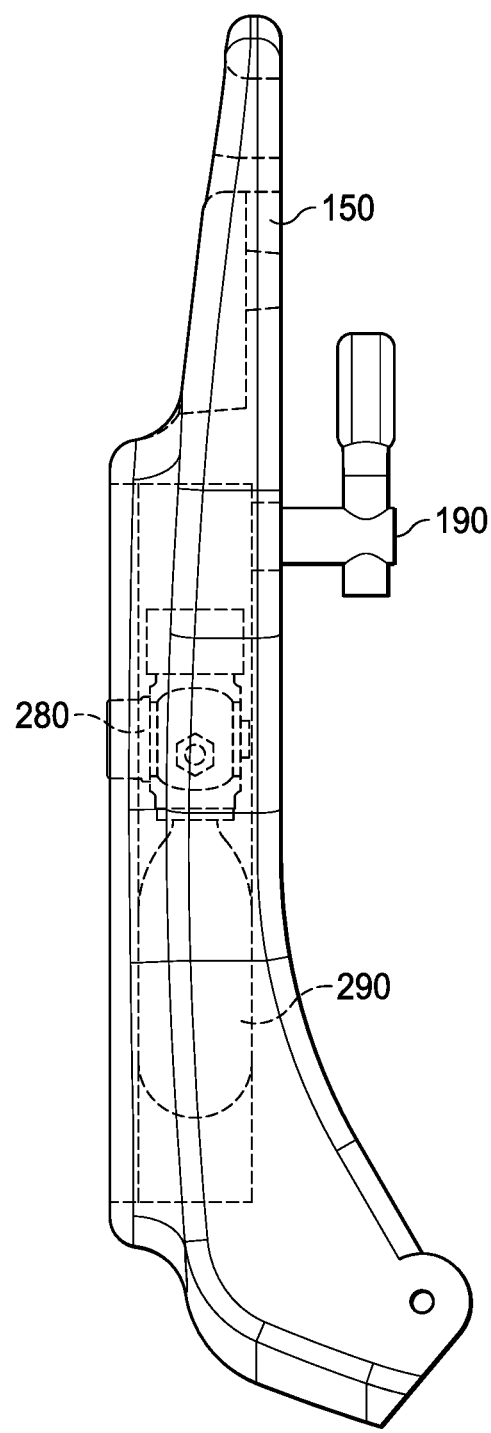
FIG. 20 is a side cut away view of the handle showing the placement of the tap and the $CO_2$ container.
Figure 21:
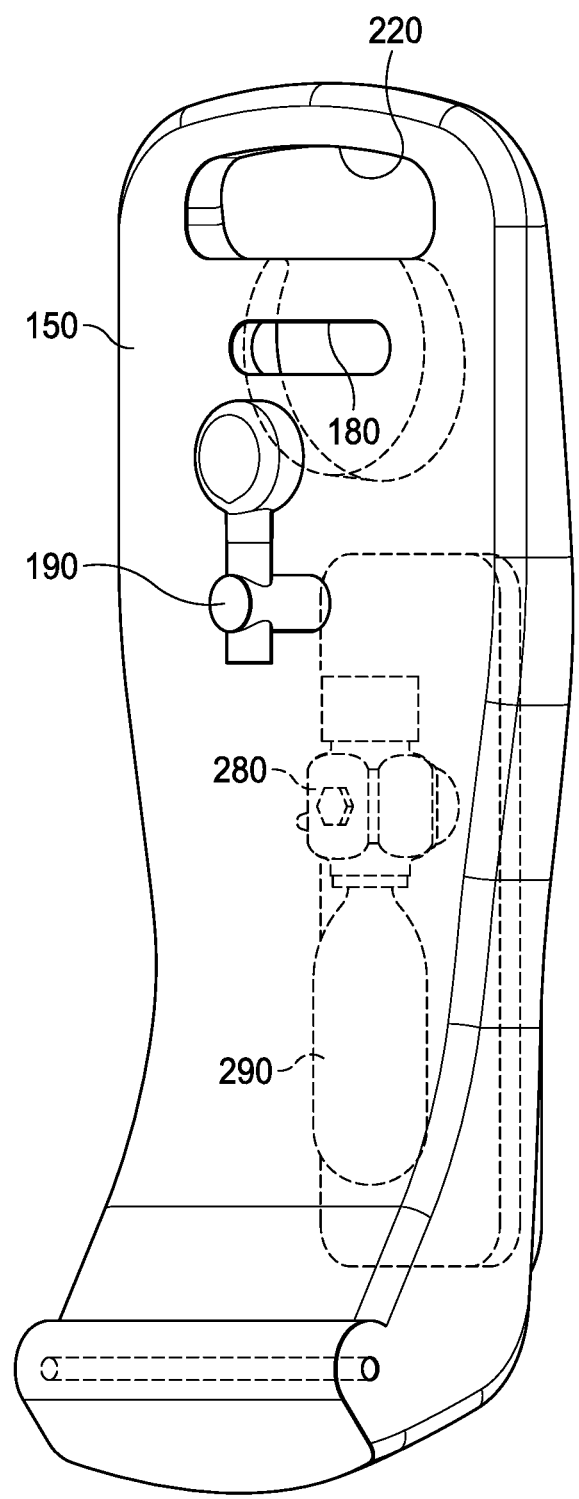
FIG. 21 is a front perspective cut away view of the handle showing the placement of the tap and the $CO_2$ container.
Figure 22:
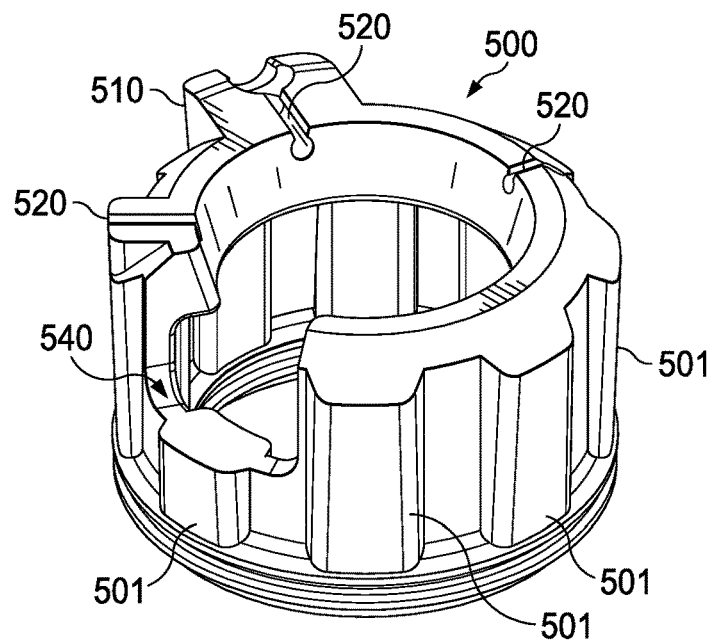
FIG. 22 is a perspective view of the removable ring.
Figure 23:
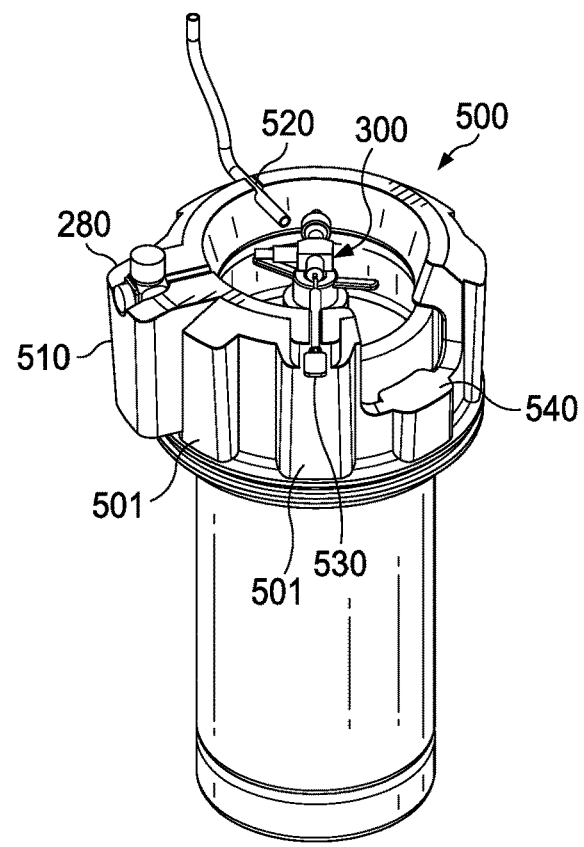
FIG. 23 is a perspective view of the retaining ring with a $CO_2$ cartridge and the degassing lever attached to the keg tap.
Figure 24:
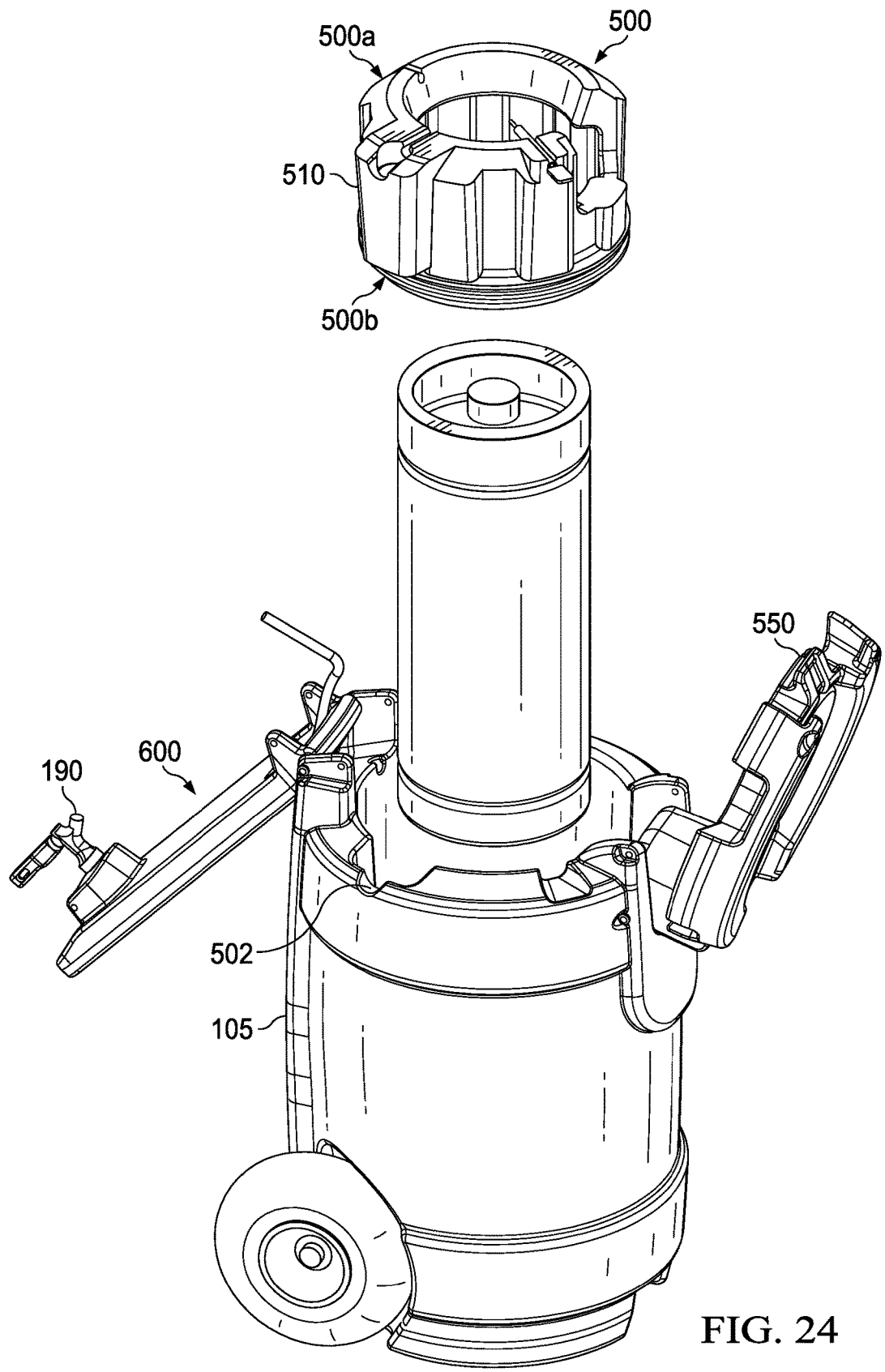
FIG. 24 is an exploded view the portable container holder in the open position showing the retaining ring, and a keg.
Figure 25:
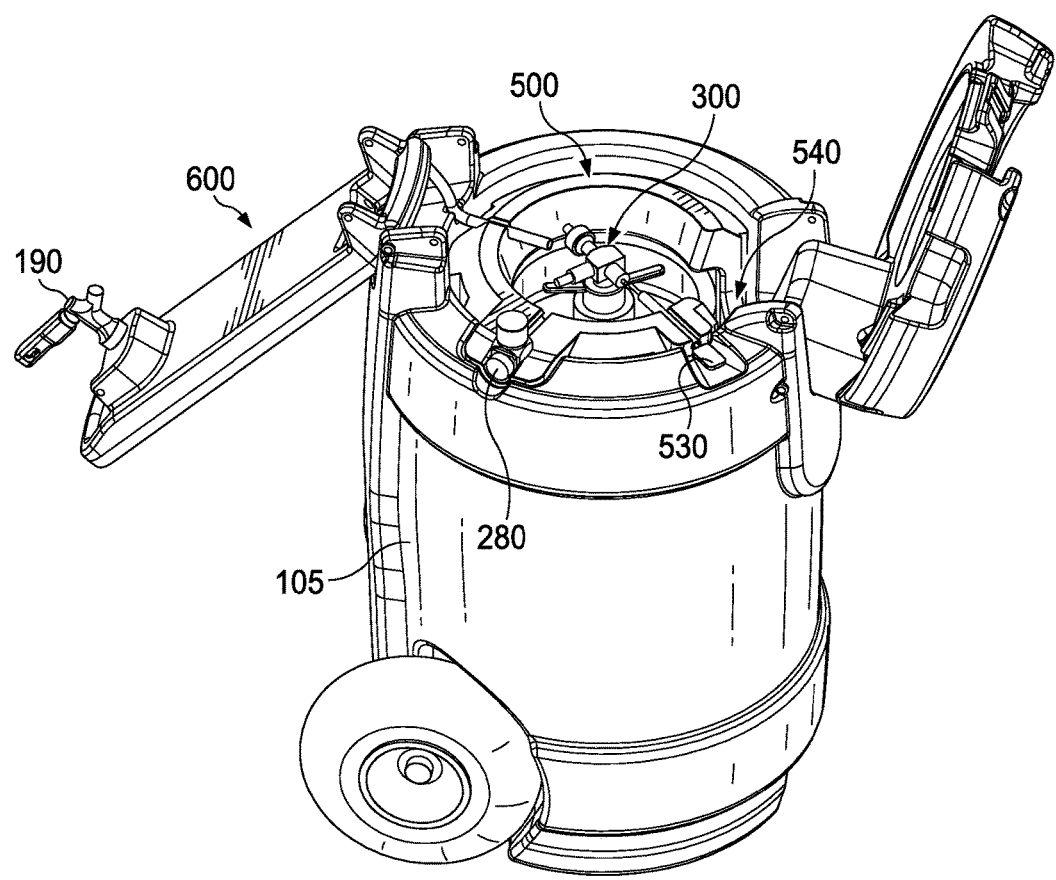
FIG. 25 shows the portable container holder opened to show the keg in place and the retaining ring in place.
Figure 26:
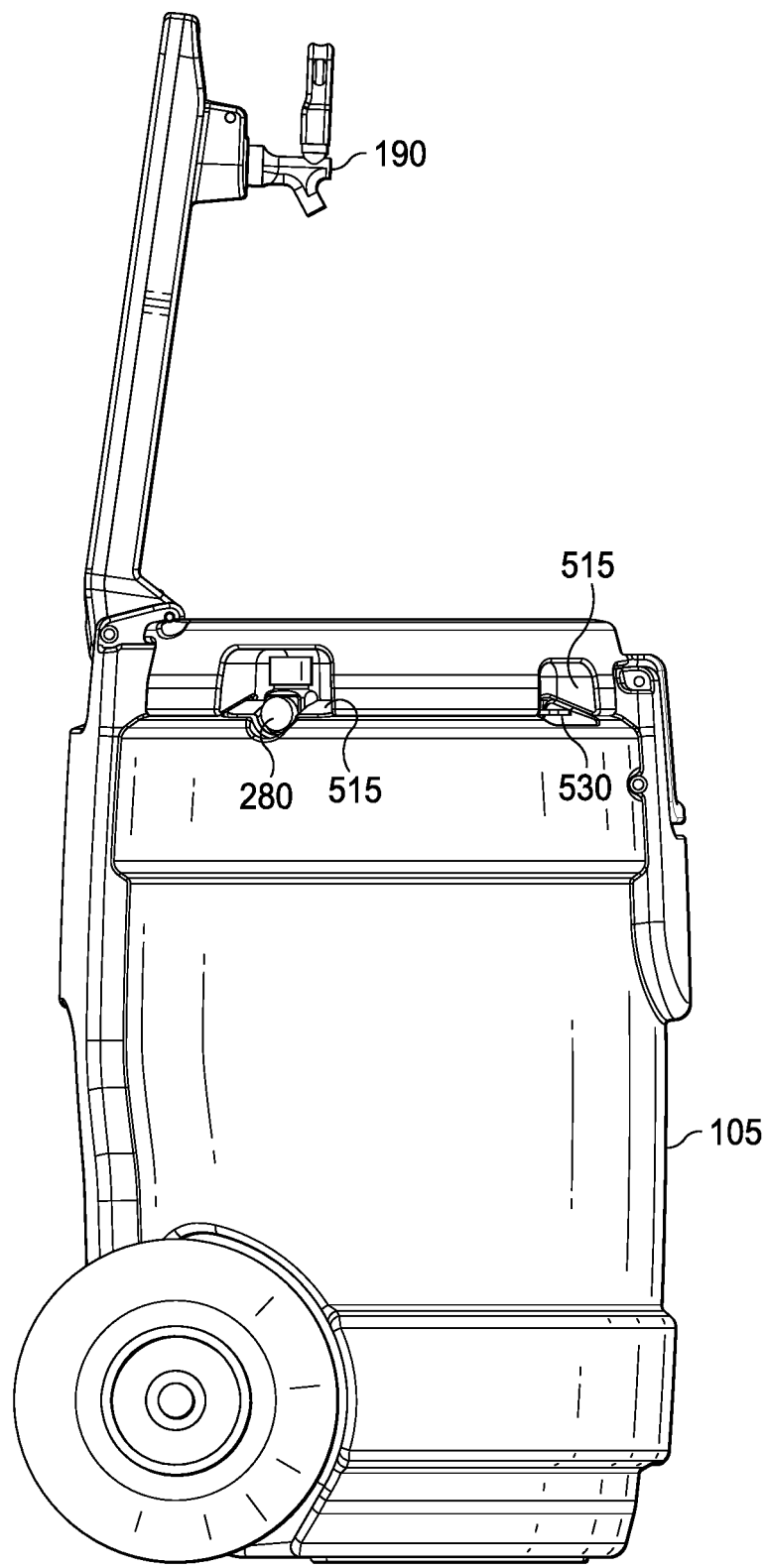
FIG. 26 is a side view of the portable container showing access to the regulator and degassing lever when the lid is in the close position.
Figure 27:
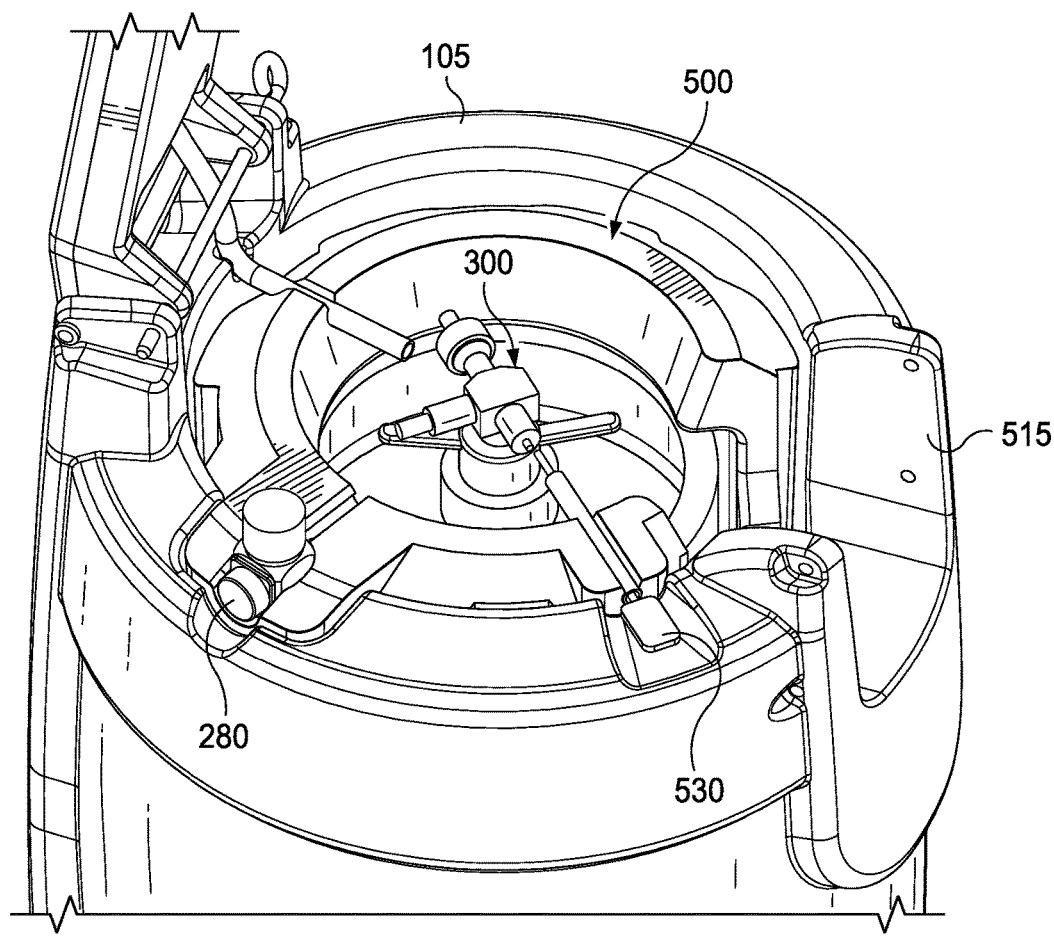
FIG. 27 is an exploded view showing the retaining ring in place.

Referring to FIGS. 1-6, a portable container 100 is provided for transporting a Sixth Barrel or Cornelius keg and dispensing a beverage. The portable container 100 has a lower receiver portion 105 and a removable lid 107. The lower receiver 105 portion has a pair of bands, a lower band 110a and an upper band 110b, extending around the exterior circumference of the lower receiver 105. The exterior surface area of the lower receiver 105 between the lower band 110a and the upper band 110b is a marking and branding area 115. The marking and branding area 115 has a smooth and flat surface that is adaptive to receive a wrap, band, sticker, or other covering bearing a message, theme, or advertisement (not shown). The lower receiver 105 has a badge button 120 that is adapted to receive a badge that is secured to the lower receiver 105 by adhesive, magnetic, or by frictional attachment. The lower receiver 105 has a pair of side handles 125a, 125b for grasping the portable container 100. The portable container 100 has a pair of wheels 112a, 112b, on the front side of the portable container 100. The lower receiver 105 also has a lower handle 130 on the front side of the receiver 105 between the pair of wheels 110a, 110b, as shown in FIGS. 2 and 5.

Referring to FIGS. 7-10 shows the portable container 100 with the handle 150 extended in the up position to dispense a beverage. The removable lid 107 frictionally engages the lower receiver portion 105. The lower receiver 105 has an extension 160 that is integrated and part of the lower receiver 105 at the front of the lower receiver 105. On top of the extension 160 there is a locking toggle 170. When the handle 150 is in the down position, the locking toggle 170 fits through a locking slot 180 in the handle. The locking toggle 170 can then be rotated to lock the handle in place thereby securing the lid 107 to the lower receiver 105. The handle 150 is pivotally attached by an axle to the back of the lower receiver 105.

The handle 150 has a bottom side that lies flush against the lid 107 when the handle 150 is in the down position. When the handle 150 is extended in the up position there is a faucet 190 for dispensing beverages located on the bottom side of the handle 150. The lid 107 has a faucet recess 200 to accommodate the faucet 190 when the handle 150 is in the down position. The lid 107 also has a handle recess 210 extending from the back of the lid 107 to the front of the lid 107. The handle recess 210 frictionally engages the handle 150 when it is in the down position. The handle 150 has a hand slot 220 near its distal end. The handle 150 and wheels 110a,110b, are located on opposite sides of the lower receiver 105 which permits safe and easy movement of the portable container by lowering the center of gravity of the load below the handle 150 during transport.

The handle 150 has a top side. The top side has a removable panel 250 that covers a component recess 260. The component recess accommodates a regulator 280 and a $CO_2$ cartridge 290. Regulators and $CO_2$ cartridges are well known in the field and can be obtained from suppliers such as Leland Limited. The $CO_2$ cartridge 290 is threadably attached to the regulator 280 so that it can be easily replaced when the $CO_2$ runs low or is depleted. A first flexible tube (not shown) extends from the regulator 280 to the keg tap 300 to push $CO_2$ into the Sixth Barrel or Cornelius keg and displace the liquid beverage. A second flexible tube (not shown) extends from the keg tap 300 to the faucet 190 for dispensing the displaced liquid beverage from the Sixth Barrel or Cornelius keg.

The lid 107 frictionally engages the lower receiver 105. The lid 107 may be removed from the lower receiver 105 when the handle 150 is in the up position thereby providing access to an internal compartment 350. The internal compartment 350 has a bottom 270 with generally circular sidewalls 360 extending from the bottom 270 to the top rim 295 of the lower receiver 105. The sidewalls 360 are insulated in order to minimize the temperature differential between the internal compartment 350 and the exterior and minimize air exchange. The insulation can be an air barrier, polyurethane foam, or foam. The bottom 270 of the internal compartment 350 has a first substantially circular mating ridge 400 and a second substantially circular mating ridge 410. The first mating ridge 400 and the second mating ridge 410 extend substantially perpendicular to the bottom 270. The first mating ridge 400 will frictionally mate with a Sixth Barrel to hold it in place. The second mating ridge will frictionally mate with a Cornelius Keg to hold it in place. The space between either the Sixth Barrel or the Cornelius Keg and the sidewall 360 can be filed with ice, dry ice, an ice blanket or some other cooling medium to chill the keg. The lower receiver 105 has a drain plug (not shown) adjacent to the bottom 270 that has a channel extending from the internal compartment 350 to the exterior to allow fluids to be drained from the internal compartment 350.

When the lid 107 is frictionally attached to the lower receiver 105 the bottom side of the lid 107 seals off the internal compartment 350. The bottom side of the lid 107 has a first mating recess 420 and a second mating recess 430. The first mating recess 420 and the second mating recess 430 indent substantially perpendicular to the bottom side of the lid 107. The first mating recess 420 will frictionally mate with a Sixth Barrel to hold it in place. The second mating recess 430 will frictionally mate with a Cornelius Keg to hold it in place. The lid 107 is insulated to maintain a temperature differential between the temperature of the interior compartment 350 and the external temperature. The insulation can be an air barrier, polyurethane foam, or foam.

In an alternative embodiment, referring to FIGS. 21 to 27, a removable ring (500) is configured for insertion into the lower receiver 105 around the Sixth Barrel or Cornelius Keg. The retaining ring 500 holds the Sixth Barrel or Cornelius Keg in the center of the lower receiver 105 and forms a water tight divider between the lower half, 500 $a$, of the lower receiver 105 that is configured to receive ice, dry ice, an ice blanket or other cooling medium for the Sixth Barrel or Cornelius Keg. The upper side of the ring, 500 $b$, is a dry environment containing the $CO_2$ cartridge, regulator and keg tap. The ring 500 has a compartment 510 for receiving the $CO_2$ cartridge and regulator 280 with an opening in the side wall 515 of the lower receiver 105 to accommodate access to the regulator's flow control valve and adjustments thereto when the lid on the portable container 100 is closed. The regulator 280 is connected to the keg tap 300 with tubing (not shown) through a tubing channel 520 in the ring 500. The keg tap 300 is connected to the faucet 190 with tubing (not shown) through a tubing channel 525 through the ring 500. A degassing lever 530 is connected to the keg tap 300 and extends through a channel in the ring 500 and extends through an opening in the side wall of the lower receiver 105 to permit access to the terminal end of the degassing lever 530 to relieve pressure in the Cornelius Keg when the lid on the portable container 100 is closed. The ring 500 has a recess 540 to accommodate the handle latch 610. The ring 500 has one or more protrusions that correspond to recesses in the sidewall of the lower receiver 105 that prevent the ring 500 from moving or rotating.

Optionally, without intending to be limiting, the removable ring 500 may have one or more protrusions 501 on the exterior surface to frictionally engage corresponding recessions 502 in the sidewalls of the lower receiver 105. The protrusions are preferably of different, nonuniform, sizes and shapes. Thereby allowing the insertion of the removable ring 500 in a single orientation. When the removable ring 500 is inserted into the lower receiver 105 the one or more protrusions 501 on the exterior surface of the removable ring 500 prevent the turning of the removable ring 500.

Optionally, the lower receiver 105 portion has a pair of bands, a lower band 110$a$ and an upper band 110$b$, extending around the exterior circumference of the lower receiver 105. The exterior surface area of the lower receiver 105 between the lower band 110$a$ and the upper band 110$b$ is a marking and branding area 115. The marking and branding area 115 has a smooth and flat surface that is adaptive to receive a wrap, band, sticker, or other covering bearing a message, theme, or advertisement (not shown).

In an alternative embodiment, the lid 550 of the portable container 100 is hingedly connected to the lower receiver 105. The lid 550 has a substantially flat recess 560 on its top exterior surface. The intended purpose of the flat recess 560 is to provide a surface for placing drink containers, cups, or the like. The lid 550 has a recess 570 on the opposite side from where the handle connects to the lower receiver 105 for receiving the faucet 190 when the handle is in the down position. Thereby protecting and concealing the faucet 190 when handle is in the down position. The retention ring 500 is configured to accommodate the recess 570. Optionally, the bottom side of the lid 550 has a first mating recess 420 and a second mating recess 430. The first mating recess 420 and the second mating recess 430 indent substantially perpendicular to the bottom side of the lid 550. The first mating recess 420 will frictionally mate with a Sixth Barrel to hold it in place. The second mating recess 430 will frictionally mate with a Cornelius Keg to hold it in place. The lid 550 is insulated to maintain a temperature differential between the temperature of the interior compartment and the external temperature. The insulation can be an air barrier, polyurethane foam, or foam.

In an alternative embodiment, the handle 600 is hingedly attached to the lower receiver 105, preferably on the same side of the lower receiver 105 as the wheels. The handle 600 has an extended position and a down (or locked) position. When the handle 600 is extended, the portable container 100 is configured to disperse a liquid beverage. The handle 600 can be locked in the extended position by inserting a locking pin 610 hinge attaching the handle 600 to the lower receiver 105. The handle 600 can also be locked in the down position when the handle is folded down and a locking pin 620 passes through the lower receiver 105, the handle 600, and optionally the faucet 190, to securely lock these items in place and prevent the unintentional opening of the portable container 100 or the accidental disbursement of a liquid beverage. The handle 600 has a badge button 615 that is adapted to receive a badge that is secured to the lower badge button 615 by adhesive, magnetic, hook and loop attachment, or by frictional attachment.

Variations or modifications to the subject matter of this invention may occur to those skilled in the art upon reviewing the invention as described herein. Such variations are intended to be encompassed within the scope of any claims of this invention that may issue upon this application. The description of the preferred embodiment, as depicted in the drawings, is set forth for illustrative purposes only and should not limit the scope of any claims that may issue upon this application.

Therefore, having described and disclosed our invention, at least the following is claimed:

1. A portable container comprising:
    a lower receiver with an internal compartment that has a bottom and substantially circular sidewalls extending from the bottom to a rim at the top of the lower receiver, and a pair of wheels;
    a retaining ring with a substantially cylindrical interior surface, a top side, a bottom side, and an exterior surface configured to frictionally engage the internal compartment of the lower receiver, wherein the retaining ring has a compartment for receiving a $CO_2$ container and a regulator with a control valve;
    a handle that is pivotally attached to the lower receiver by an axel, the handle has a down position and an up position, and a faucet for dispensing a liquid; and,
    a lid that is pivotally attached to the lower receiver by an axel, the lid has an open position and a closed position, and a recess for receiving the faucet when the handle is in the down position.

2. The portable container of claim 1 wherein the lid has a recess that allows access to the control valve on the regulator when the lid is in the closed position.

3. A portable container of claim 1 further comprising a keg tap with a degassing lever wherein the first end of the degassing lever is attached to the keg tap and the lid has a recess that allows access to the second end of the degassing lever when the lid is in the closed position.

4. A portable container of claim 1 wherein the retaining ring frictionally engages a keg to form a water proof seal wherein the area between the underside of the retaining ring and the bottom of the internal compartment may contain fluid and the area between the top side of the retaining ring and the lid remains substantially dry.

5. A portable container of claim 1 wherein the retaining ring has one or more protrusions on the exterior surface to frictionally engage corresponding recessions in the sidewalls of the lower receiver.

6. A portable container according to claim 1 wherein the lower receiver includes:
    a first substantially circular mating ridge and a second substantially circular mating ridge on the bottom of the internal compartment that are adapted to frictionally mate with a keg.

7. A portable container according to claim 1 wherein the lower receiver has an upper band and a lower band, the pair of bands extending around the exterior circumference of the lower receiver; and,
    a message area extending around the exterior circumference of the lower receiver in between the upper band and the lower band, wherein the surface of the message area is adaptive to receiving a message, theme, or advertisement.

8. A portable container according to claim 1 further comprising:
    a badge button on the handle that is adapted to receive a badge.

9. A portable container according to claim 1 wherein the lower receiver and the lid are insulated to maintain a temperature differential between the temperature of the interior compartment and the external ambient temperature.

10. A portable container comprising:
    a lower receiver with an internal compartment that has a bottom and substantially circular sidewalls extending from the bottom to a rim at the top of the lower receiver, and a pair of wheels;
    a retaining ring with a substantially cylindrical interior surface, a top side, a bottom side, and an exterior surface configured to frictionally engage the internal compartment of the lower receiver, wherein the exterior surface has one or more protrusions to frictionally engage corresponding recessions in the sidewalls of the lower receiver;
    a handle that is pivotally attached to the lower receiver by an axel, the handle has a down position and an up position, and a faucet for dispensing a liquid; and,
    a lid that is pivotally attached to the lower receiver by an axel, the lid has an open position and a closed position, and a recess for receiving the faucet when the handle is in the down position.

11. A portable container according to claim 10 wherein a protrusion on the exterior surface of the retaining ring is configured to receive a $CO_2$ canister and a regulator.

12. The portable container of claim 11 wherein the lid has a recess that allows access to a control valve on the regulator when the lid is in the closed position.

13. A portable container of claim 10 further comprising a keg tap with a degassing lever wherein a first end of the degassing lever is attached to the keg tap and the lid has a recess that allows access to the second end of the degassing lever when the lid is in the closed position.

14. A portable container according to claim 10 wherein the lower receiver includes:
    a first substantially circular mating ridge and a second substantially circular mating ridge on the bottom of the internal compartment that are adapted to frictionally mate with a keg.

15. A portable container according to claim 10 wherein the lower receiver has an upper band and a lower band, the pair of bands extending around the exterior circumference of the lower receiver; and,
    a message area extending around the exterior circumference of the lower receiver in between the upper band and the lower band, wherein the surface of the message area is adaptive to receiving a message, theme, or advertisement.

16. A portable container according to claim 10 further comprising:
    a badge button on the handle that is adapted to receive a badge.

17. A portable container according to claim 10 wherein the lower receiver and the lid are insulated to maintain a temperature differential between the temperature of the interior compartment and the external ambient temperature.

18. A portable container comprising:
a lower receiver with an internal compartment that has a bottom and substantially circular sidewalls extending from the bottom to a rim at the top of the lower receiver, and a pair of wheels;
a retaining ring with a substantially cylindrical interior surface, a top side, a bottom side, and an exterior surface configured to frictionally engage the internal compartment of the lower receiver, the exterior surface has one or more protrusions to frictionally engage corresponding recessions in the sidewalls of the lower receiver, wherein the protrusion on the exterior surface of the retaining ring is configured to receive a $CO_2$ canister and a regulator;
a handle that is pivotally attached to the lower receiver by an axel, the handle has a down position and an up position, and a faucet for dispensing a liquid; and,
a lid that is pivotally attached to the lower receiver by an axel, the lid has an open position and a closed position, and a recess for receiving the faucet when the handle is in the down position, wherein the lid has a recess that allows access to a control valve on the regulator when the lid is in the closed position.

\* \* \* \* \*